United States Patent
Li et al.

(10) Patent No.: US 12,513,689 B2
(45) Date of Patent: Dec. 30, 2025

(54) COMMUNICATION METHOD AND COMMUNICATION APPARATUS EMPLOYING DYNAMIC SPECTRUM RESOURCE SHARING

(71) Applicant: HUAWEI TECHNOLOGIES CO., LTD., Guangdong (CN)

(72) Inventors: Shengyu Li, Beijing (CN); Lei Guan, Beijing (CN); Dan Hu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 17/529,123

(22) Filed: Nov. 17, 2021

(65) Prior Publication Data

US 2022/0078823 A1 Mar. 10, 2022

Related U.S. Application Data

(63) Continuation of application No. PCT/CN2020/088920, filed on May 7, 2020.

(30) Foreign Application Priority Data

May 17, 2019 (CN) .......................... 201910413199.3

(51) Int. Cl.
*H04W 72/1268* (2023.01)
*H04L 5/00* (2006.01)
(Continued)

(52) U.S. Cl.
CPC ....... *H04W 72/1268* (2013.01); *H04L 5/0051* (2013.01); *H04W 72/0446* (2013.01);
(Continued)

(58) Field of Classification Search
CPC ......... H04W 72/1268; H04W 72/0446; H04W 72/0453; H04W 72/23; H04W 72/30;
(Continued)

(56) References Cited

U.S. PATENT DOCUMENTS

| | | | |
|---|---|---|---|
| 11,665,773 B2* | 5/2023 | Huang | H04W 72/535 370/329 |
| 11,711,843 B2* | 7/2023 | Wong | H04L 1/1819 370/329 |

(Continued)

FOREIGN PATENT DOCUMENTS

| | | |
|---|---|---|
| CN | 109121211 A | 1/2019 |
| CN | 109309951 A | 2/2019 |

(Continued)

OTHER PUBLICATIONS

Convida Wireless, On Intra-UE prioritization. 3GPP TSG-RAN WG1 Meeting #96bis, Xi''an, China, Apr. 8-12, 2019, R1-1905449, 4 pages.

(Continued)

*Primary Examiner* — Atique Ahmed

(57) ABSTRACT

This application provides a communication method and a communication apparatus. The communication method includes: receiving first downlink control information DCI, the first DCI indicating a first time-frequency resource; determining a second time-frequency resource, where the second time-frequency resource is used for uplink transmission, and the first time-frequency resource overlaps the second time-frequency resource; and when the uplink transmission meets a first condition, transmitting uplink information on the second time-frequency resource.

12 Claims, 8 Drawing Sheets

(51) Int. Cl.
*H04W 72/0446* (2023.01)
*H04W 72/0453* (2023.01)
*H04W 72/23* (2023.01)
*H04W 72/30* (2023.01)

(52) U.S. Cl.
CPC ....... *H04W 72/0453* (2013.01); *H04W 72/23* (2023.01); *H04W 72/30* (2023.01)

(58) Field of Classification Search
CPC .. H04W 72/569; H04W 72/21; H04L 5/0051; H04L 47/245
See application file for complete search history.

(56) References Cited

U.S. PATENT DOCUMENTS

| | | | | |
|---|---|---|---|---|
| 2017/0289966 | A1* | 10/2017 | Islam | H04L 5/0091 |
| 2019/0150200 | A1 | 5/2019 | Chen et al. | |
| 2019/0166625 | A1* | 5/2019 | Nam | H04L 1/0058 |
| 2019/0306801 | A1* | 10/2019 | Zhou | H04W 52/44 |
| 2019/0306865 | A1* | 10/2019 | Medles | H04W 72/0446 |
| 2019/0342910 | A1* | 11/2019 | Cao | H04W 72/23 |
| 2020/0067675 | A1* | 2/2020 | Takeda | H04L 5/0053 |
| 2020/0128558 | A1* | 4/2020 | Lu | H04W 72/51 |
| 2020/0351897 | A1* | 11/2020 | Fakoorian | H04L 5/0096 |
| 2021/0014866 | A1* | 1/2021 | Shi | H04W 24/08 |
| 2021/0168842 | A1* | 6/2021 | Liang | H04W 72/0446 |
| 2022/0150014 | A1* | 5/2022 | Wong | H04L 5/0048 |
| 2022/0150838 | A1* | 5/2022 | Takeda | H04W 72/0446 |
| 2022/0217736 | A1* | 7/2022 | Taherzadeh Boroujeni | H04L 5/0094 |

FOREIGN PATENT DOCUMENTS

| | | | | |
|---|---|---|---|---|
| CN | 109429349 A | | 3/2019 | |
| CN | 109699063 A | | 4/2019 | |
| CN | 109716698 A | | 5/2019 | |
| CN | 109756980 A | | 5/2019 | |
| CN | 110972302 A | * | 4/2020 | ............ H04W 72/23 |
| WO | 2016018056 A1 | | 2/2016 | |
| WO | 2018085485 A1 | | 5/2018 | |
| WO | 2018126934 A1 | | 7/2018 | |
| WO | 2019024918 A1 | | 2/2019 | |
| WO | 2019051096 A1 | | 3/2019 | |
| WO | 2019084570 A1 | | 5/2019 | |
| WO | WO-2020065733 A1 | * | 4/2020 | ............ H04W 24/10 |
| WO | WO-2020197121 A1 | * | 10/2020 | ............ H04L 1/1812 |

OTHER PUBLICATIONS

Huawei, HiSilicon, Discussion on differentiation of eMBB and URLLC services. 3GPP TSG RAN WGI Meeting #97, Reno, USA, May 13-17, 2019, R1-1906610, 3 pages.
Panasonic, On inter UE Tx prioritization/multiplexing enhancements for NR URLLC. 3GPP TSG RAN WG1 #97, Reno, USA, May 13-17, 2019, R1-1907030, 6 pages.
InterDigital Inc., On Enhanced inter UE Tx prioritization/ multiplexing for eURLLC. 3GPP TSG RAN WG 1 #97, Reno, USA, Apr. 13-17, 2019, R1-1907108, 4 pages.
Huawei, HiSilicon, UL inter-UE transmission prioritization and multiplexing . 3GPP TSG RAN WG1 Meeting #97, Reno, USA, May 13, 17, 2019, R1-1906061, 10 pages.
Ericsson, Intra-UE Prioritization and Multiplexing of UL Data Transmissions. 3GPP TSG RAN WG1 Meeting #97, Reno, Nevada, USA, May 13-17, 2019, R1-1906099, 3 pages.

* cited by examiner

COMMUNICATION METHOD AND COMMUNICATION APPARATUS EMPLOYING DYNAMIC SPECTRUM RESOURCE SHARING

CROSS-REFERENCE TO RELATED APPLICATIONS

This application is a continuation of International Patent Application No. PCT/CN2020/088920, filed on May 7, 2020, which claims priority to Chinese Patent Application No. 201910413199.3, filed on May 17, 2019. The disclosures of the aforementioned applications are hereby incorporated by reference in their entireties.

TECHNICAL FIELD

This application relates to the communication field, and more specifically, to a communication method and a communication apparatus.

BACKGROUND

With development of communication technologies, system performance of 5th generation (5G) communication systems is continuously improved. Compared with 4th generation (4G) communication systems, the 5G communication systems are notably characterized by support in an ultra-reliable low-latency communication (URLLC) service. Some URLLC services are bursty, aperiodic, and unpredictable, and spectrum sharing cannot be semi-statically performed between the URLLC services and an enhanced mobile broadband (eMBB) service. To improve spectrum resource utilization while ensuring URLLC transmission requirements for a low latency and high reliability, in a new radio (NR) system, dynamic spectrum resource sharing of the URLLC service can be implemented through multiplexing or preemption, so that a transmission latency of the URLLC service is reduced. Correspondingly, a base station sends a preemption indication (PI) to an eMBB UE, to indicate that a time-frequency resource previously scheduled for the eMBB UE is preempted.

Currently, a user equipment (UE) in the NR system may be a hybrid service user (hybrid UE), that is, one UE may simultaneously transmit a URLLC service and an eMBB service. The UE has two types: a URLLC UE, which may be urgently scheduled to preempt a time-frequency resource of another eMBB UE (or hybrid UE); and an eMBB UE, where a resource allocated to the eMBB UE may be preempted by another UE. If a URLLC transmission resource of the hybrid UE is preempted by using a PI triggered by the hybrid UE, or a lower-priority URLLC service preempts a transmission resource of a higher-priority URLLC service, reliability of URLLC service transmission is affected.

SUMMARY

This application provides a communication method and a communication apparatus, to improve reliability of resource preemption by a URLLC service during uplink transmission, and ensure reliable transmission of the URLLC service.

According to a first aspect, a communication method is provided. The method includes: receiving first downlink control information DCI, where the first DCI is used to indicate a first time-frequency resource; determining a second time-frequency resource, where the second time-frequency resource is used for uplink transmission, and the first time-frequency resource overlaps the second time-frequency resource; and when the uplink transmission meets a first condition, transmitting uplink information on the second time-frequency resource.

According to the method provided in this embodiment of this application, the first time-frequency resource overlaps the second time-frequency resource, and the uplink information is transmitted on the second time-frequency resource when the uplink transmission meets the first condition, to prevent a URLLC transmission resource of a UE from being preempted by using a PI triggered by the UE, or prevent a lower-priority URLLC service from preempting a transmission resource of a higher-priority URLLC service, so that reliability of resource preemption by a URLLC service during uplink transmission can be improved.

In some embodiments, the method further includes: when the uplink transmission does not meet the first condition, skipping transmitting the uplink information on an overlapping time-frequency resource between the second time-frequency resource and the first time-frequency resource.

In some embodiments, the uplink transmission is scheduled by using second DCI, and the first condition is that a sending moment of the first DCI is not later than a sending moment of the second DCI.

According to the method provided in this embodiment of this application, the first condition is that the sending moment of the first DCI is not later than the sending moment of the second DCI, and the UE may determine, based on the first condition, whether to transmit the uplink information on the second time-frequency resource. Therefore, according to the method provided in this application, a more appropriate transmission decision can be achieved during uplink transmission, to ensure that uplink transmission of a URLLC user does not preempt a resource of previous uplink transmission of the URLLC user or a resource of subsequently scheduled higher-priority URLLC transmission.

In some embodiments, the uplink transmission is a dynamically scheduled uplink data channel, and the second DCI is used to schedule the uplink data channel; the uplink transmission is a dynamically scheduled uplink control channel, and the second DCI is used to schedule the uplink control channel; the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

In some embodiments, the first condition is that the second uplink transmission is not configured uplink transmission. The configured uplink transmission includes at least one of a configured grant uplink data channel, an uplink control channel carrying a scheduling request, feedback information of semi-persistent scheduling downlink data transmission, a configured uplink control channel, a configured uplink sounding reference signal, or a configured random access channel.

In some embodiments, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

According to the method provided in this embodiment of this application, it may be determined that the uplink transmission that meets the first condition is URLLC transmission. In this case, the UE transmits the uplink information on the second time-frequency resource, to prevent a transmission resource of a URLLC service from being preempted by using a UL PI, so that reliability of resource preemption by the URLLC service during uplink transmission can be improved.

In some embodiments, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

According to the method provided in this embodiment of this application, it may be determined that the uplink transmission that meets the first condition is URLLC transmission. In this case, the UE transmits the uplink information on the second time-frequency resource, to prevent a transmission resource of a URLLC service from being preempted by using a UL PI, so that reliability of resource preemption by the URLLC service during uplink transmission can be improved.

In some embodiments, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

According to the method provided in this embodiment of this application, when the priority of the uplink transmission is greater than or equal to the first priority, the UE transmits the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

According to the method provided in this embodiment of this application, when the priority of the uplink transmission is greater than or equal to the first priority, the UE transmits the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the first DCI is multicasting downlink control information GC-DCI.

According to a second aspect, a communication method is provided. The method includes: sending first downlink control information DCI, where the first DCI is used to indicate a first time-frequency resource; and when uplink transmission meets a first condition, receiving uplink information on a second time-frequency resource, where the second time-frequency resource is used for the uplink transmission, the uplink information is carried on the second time domain resource, and the first time-frequency resource overlaps the second time-frequency resource.

That is, when the uplink transmission meets the first condition, the uplink information is received on the second time-frequency resource; and when the uplink transmission does not meet the first condition, the uplink information corresponding to the uplink transmission is not received on an overlapping time-frequency resource between the second time-frequency resource and the first time-frequency resource, but uplink information corresponding to other uplink transmission may be received on the overlapping time-frequency resource.

According to the method provided in this embodiment of this application, the first time-frequency resource overlaps the second time-frequency resource, and the uplink information is received on the second time-frequency resource when the uplink transmission meets the first condition, to prevent a URLLC transmission resource of a UE from being preempted by using a PI triggered by the UE, or prevent a lower-priority URLLC service from preempting a transmission resource of a higher-priority URLLC service, so that reliability of resource preemption by a URLLC service during uplink transmission can be improved.

In some embodiments, the method further includes: when the uplink transmission does not meet the first condition, skipping receiving the uplink information on an overlapping time-frequency resource between the second time-frequency resource and the first time-frequency resource.

In some embodiments, the uplink transmission is scheduled by using second DCI, and the first condition is that a sending moment of the first DCI is not later than a sending moment of the second DCI.

According to the method provided in this embodiment of this application, the first condition is that the sending moment of the first DCI is not later than the sending moment of the second DCI, and a base station may determine, based on the first condition, whether to receive the uplink information on the second time-frequency resource. Therefore, according to the method provided in this application, a more appropriate transmission decision can be achieved during uplink transmission, to ensure that uplink transmission of a URLLC user does not preempt a resource of previous uplink transmission of the URLLC user or a resource of subsequently scheduled higher-priority URLLC transmission.

In some embodiments, the uplink transmission is a dynamically scheduled uplink data channel, and the second DCI is used to schedule the uplink data channel; the uplink transmission is a dynamically scheduled uplink control channel, and the second DCI is used to schedule the uplink control channel; the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

In some embodiments, the first condition is that the second uplink transmission is not configured uplink transmission. The configured uplink transmission includes at least one of a configured grant uplink data channel, an uplink control channel carrying a scheduling request, feedback information of semi-persistent scheduling downlink data transmission, a configured uplink control channel, a configured uplink sounding reference signal, or a configured random access channel.

In some embodiments, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

According to the method provided in this embodiment of this application, it may be determined that the uplink transmission that meets the first condition is URLLC transmission. In this case, the base station receives the uplink information on the second time-frequency resource, to prevent a transmission resource of a URLLC service from being preempted by using a UL PI, so that reliability of resource preemption by the URLLC service during uplink transmission can be improved.

In some embodiments, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

According to the method provided in this embodiment of this application, it may be determined that the uplink transmission that meets the first condition is URLLC transmission. In this case, the base station receives the uplink information on the second time-frequency resource, to prevent a transmission resource of a URLLC service from being preempted by using a UL PI, so that reliability of resource preemption by the URLLC service during uplink transmission can be improved.

In some embodiments, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

According to the method provided in this embodiment of this application, when the priority of the uplink transmission is greater than or equal to the first priority, the base station receives the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

According to the method provided in this embodiment of this application, when the priority of the uplink transmission is greater than or equal to the first priority, the base station receives the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the first DCI is multicasting downlink control information GC-DCI.

According to a third aspect, a communication apparatus is provided. The apparatus includes: a receiving unit, configured to receive first downlink control information DCI, where the first DCI is used to indicate a first time-frequency resource; a processing unit, configured to determine a second time-frequency resource, where the second time-frequency resource is used for uplink transmission, and the first time-frequency resource overlaps the second time-frequency resource; and a sending unit, configured to transmit uplink information on the second time-frequency resource when the uplink transmission meets a first condition.

According to the communication apparatus provided in this embodiment of this application, the first time-frequency resource overlaps the second time-frequency resource, and the communication apparatus transmits the uplink information on the second time-frequency resource when the uplink transmission meets the first condition, to prevent a URLLC transmission resource of the communication apparatus from being preempted by using a PI triggered by the communication apparatus, or prevent a lower-priority URLLC service from preempting a transmission resource of a higher-priority URLLC service, so that reliability of resource preemption by a URLLC service during uplink transmission can be improved.

In some embodiments, the sending unit is further configured to: when the uplink transmission does not meet the first condition, skip transmitting the uplink information on an overlapping time-frequency resource between the second time-frequency resource and the first time-frequency resource.

In some embodiments, the uplink transmission is scheduled by using second DCI, and the first condition is that a sending moment of the first DCI is not later than a sending moment of the second DCI.

According to the communication apparatus provided in this embodiment of this application, the first condition is that the sending moment of the first DCI is not later than the sending moment of the second DCI, and the communication apparatus may determine, based on the first condition, whether to transmit the uplink information on the second time-frequency resource. Therefore, according to the method provided in this application, a more appropriate transmission decision can be achieved during uplink transmission, to ensure that uplink transmission of a URLLC user does not preempt a resource of previous uplink transmission of the URLLC user or a resource of subsequently scheduled higher-priority URLLC transmission.

In some embodiments, the uplink transmission is a dynamically scheduled uplink data channel, and the second DCI is used to schedule the uplink data channel; the uplink transmission is a dynamically scheduled uplink control channel, and the second DCI is used to schedule the uplink control channel; the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

In some embodiments, the first condition is that the second uplink transmission is not configured uplink transmission. The configured uplink transmission includes at least one of a configured grant uplink data channel, an uplink control channel carrying a scheduling request, feedback information of semi-persistent scheduling downlink data transmission, a configured uplink control channel, a configured uplink sounding reference signal, or a configured random access channel.

In some embodiments, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

According to the communication apparatus provided in this embodiment of this application, it may be determined that the uplink transmission that meets the first condition is URLLC transmission. In this case, the communication apparatus transmits the uplink information on the second time-frequency resource, to prevent a transmission resource of a URLLC service from being preempted by using a UL PI, so that reliability of resource preemption by the URLLC service during uplink transmission can be improved.

In some embodiments, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

According to the communication apparatus provided in this embodiment of this application, it may be determined that the uplink transmission that meets the first condition is URLLC transmission. In this case, the communication apparatus transmits the uplink information on the second time-frequency resource, to prevent a transmission resource of a URLLC service from being preempted by using a UL PI, so that reliability of resource preemption by the URLLC service during uplink transmission can be improved.

In some embodiments, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

According to the communication apparatus provided in this embodiment of this application, when the priority of the uplink transmission is greater than or equal to the first priority, the communication apparatus transmits the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

According to the communication apparatus provided in this embodiment of this application, when the priority of the uplink transmission is greater than or equal to the first priority, the communication apparatus transmits the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the first DCI is multicasting downlink control information GC-DCI.

According to a fourth aspect, a communication apparatus is provided. The apparatus includes: a sending unit, configured to send first downlink control information DCI, where the first DCI is used to indicate a first time-frequency resource; and a receiving unit, configured to receive uplink information on a second time-frequency resource when uplink transmission meets a first condition, where the second time-frequency resource is used for the uplink transmission, the uplink information is carried on the second time domain resource, and the first time-frequency resource overlaps the second time-frequency resource.

That is, when the uplink transmission meets the first condition, the communication apparatus receives the uplink information on the second time-frequency resource; and when the uplink transmission does not meet the first condition, the communication apparatus does not receive, on an overlapping time-frequency resource between the second time-frequency resource and the first time-frequency resource, the uplink information corresponding to the uplink transmission, but may receive uplink information corresponding to other uplink transmission on the overlapping time-frequency resource.

According to the communication apparatus provided in this embodiment of this application, the first time-frequency resource overlaps the second time-frequency resource, and the communication apparatus receives the uplink information on the second time-frequency resource when the uplink transmission meets the first condition, to prevent a URLLC transmission resource of a UE from being preempted by using a PI triggered by the UE, or prevent a lower-priority URLLC service from preempting a transmission resource of a higher-priority URLLC service, so that reliability of resource preemption by a URLLC service during uplink transmission can be improved.

In some embodiments, the receiving unit is further configured to: when the uplink transmission does not meet the first condition, skip receiving the uplink information on an overlapping time-frequency resource between the second time-frequency resource and the first time-frequency resource.

In some embodiments, the uplink transmission is scheduled by using second DCI, and the first condition is that a sending moment of the first DCI is not later than a sending moment of the second DCI.

According to the communication apparatus provided in this embodiment of this application, the first condition is that the sending moment of the first DCI is not later than the sending moment of the second DCI, and the communication apparatus may determine, based on the first condition, whether to receive the uplink information on the second time-frequency resource. Therefore, according to the method provided in this application, a more appropriate transmission decision can be achieved during uplink transmission, to ensure that uplink transmission of a URLLC user does not preempt a resource of previous uplink transmission of the URLLC user or a resource of subsequently scheduled higher-priority URLLC transmission.

In some embodiments, the uplink transmission is a dynamically scheduled uplink data channel, and the second DCI is used to schedule the uplink data channel; the uplink transmission is a dynamically scheduled uplink control channel, and the second DCI is used to schedule the uplink control channel; the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

In some embodiments, the first condition is that the second uplink transmission is not configured uplink transmission. The configured uplink transmission includes at least one of a configured grant uplink data channel, an uplink control channel carrying a scheduling request, feedback information of semi-persistent scheduling downlink data transmission, a configured uplink control channel, a configured uplink sounding reference signal, or a configured random access channel.

In some embodiments, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

According to the communication apparatus provided in this embodiment of this application, it may be determined that the uplink transmission that meets the first condition is URLLC transmission. In this case, the communication apparatus receives the uplink information on the second time-frequency resource, to prevent a transmission resource of a URLLC service from being preempted by using a UL PI, so that reliability of resource preemption by the URLLC service during uplink transmission can be improved.

In some embodiments, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

According to the communication apparatus provided in this embodiment of this application, it may be determined that the uplink transmission that meets the first condition is URLLC transmission. In this case, the communication apparatus receives the uplink information on the second time-frequency resource, to prevent a transmission resource of a URLLC service from being preempted by using a UL PI, so that reliability of resource preemption by the URLLC service during uplink transmission can be improved.

In some embodiments, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

According to the communication apparatus provided in this embodiment of this application, when the priority of the uplink transmission is greater than or equal to the first priority, the communication apparatus receives the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

According to the communication apparatus provided in this embodiment of this application, when the priority of the uplink transmission is greater than or equal to the first priority, the communication apparatus receives the uplink information on the second time-frequency resource, to prevent a lower-priority URLLC service from preempting a transmission resource of a higher-priority URLLC service, so that reliability of resource preemption by a URLLC service during uplink transmission can be improved.

In some embodiments, the first DCI is multicasting downlink control information GC-DCI.

According to a fifth aspect, a communication apparatus is provided and includes a processor. The processor is coupled to a memory, and may be configured to execute instructions in the memory, to implement the method according to any one of the first aspect and the embodiments of the first aspect.

Optionally, the communication apparatus further includes a communication interface, and the processor is coupled to the communication interface.

In an implementation, the communication apparatus is a terminal device. When the communication apparatus is the terminal device, the communication interface may be a transceiver or an input/output interface.

In another implementation, the communication apparatus is a chip disposed in the terminal device. When the communication apparatus is the chip disposed in the terminal device, the communication interface may be an input/output interface of the chip.

Optionally, the transceiver may be a transceiver circuit. Optionally, the input/output interface may be an input/output circuit.

In another implementation, the communication apparatus may alternatively be the terminal device in any one of the foregoing implementations, to implement a step or a function of the terminal device in any one of the foregoing implementations.

In an implementation, the communication apparatus is a network device. When the communication apparatus is the network device, the communication interface may be a transceiver or an input/output interface.

In another implementation, the communication apparatus is a chip disposed in the network device. When the communication apparatus is the chip disposed in the network device, the communication interface may be an input/output interface of the chip.

Optionally, the transceiver may be a transceiver circuit. Optionally, the input/output interface may be an input/output circuit.

In another implementation, the communication apparatus may alternatively be the network device in any one of the foregoing implementations, to implement a step or a function of the network device in any one of the foregoing implementations.

For example, the communication apparatus may include a receiving unit and a sending unit. For example, the sending unit may be a transmitter, and the receiving unit may be a receiver. In another implementation, for example, the sending unit and the receiving unit in the communication apparatus in this application may be implemented by a same module. For example, functions of the sending unit and the receiving unit are implemented by using one transceiver circuit module. The communication apparatus may further include a processing unit, and the processing unit may be a processor. The communication apparatus may further include a storage unit, and the storage unit may be a memory. The storage unit is configured to store instructions, and the processing unit executes the instructions stored in the storage unit, so that the communication apparatus performs the method according to any one of the foregoing aspects and the optional implementations of the aspects. When the communication apparatus is a chip, the processing unit may be a processor, and the receiving unit/sending unit may be an input/output interface, a pin, a circuit, or the like. The processing unit executes the instructions stored in the storage unit, so that the communication apparatus performs the method according to any one of the foregoing aspects and the optional implementations of the aspects. The storage unit may be a storage unit (for example, a register or a cache) in the chip, or may be a storage unit (for example, a read-only memory or a random access memory) that is outside the chip and in the communication apparatus.

According to a sixth aspect, a processor is provided. The processor includes an input circuit, an output circuit, and a processing circuit. The processing circuit is configured to receive a signal through the input circuit, and transmit a signal through the output circuit, so that the processor performs the method according to any one of the foregoing aspects and the embodiments of the aspects.

In an implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example but not limited to, a receiver, a signal output by the output circuit may be output to, for example but not limited to, a transmitter and transmitted by the transmitter, and the input circuit and the output circuit may be a same circuit, where the circuit is used as the input circuit and the output circuit at different moments. Implementations of the processor and the various circuits are not limited in the embodiments of this application.

According to a seventh aspect, a processing apparatus is provided. The processing apparatus includes a processor, and may further include a memory. The processor is configured to: read instructions stored in the memory, receive a signal by using a receiver, and transmit a signal by using a transmitter, to perform the method according to any one of the foregoing aspects and the embodiments of the aspects.

Optionally, there are one or more processors, and there are one or more memories.

Optionally, the memory may be integrated with the processor, or the memory and the processor may be separately disposed.

In an implementation process, the memory may be a non-transitory memory, for example, a read-only memory (ROM). The memory and the processor may be integrated into one chip, or may be disposed in different chips. A type of the memory and a manner of disposing the memory and the processor are not limited in this embodiment of this application.

The processing apparatus in the seventh aspect may be a chip. The processor may be implemented by using hardware, or may be implemented by using software. When the processor is implemented by using hardware, the processor may be a logic circuit, an integrated circuit, or the like. When the processor is implemented by using software, the processor may be a general purpose processor, and is implemented by reading software code stored in the memory. The memory may be integrated into the processor, or may be located outside the processor and exist independently.

According to an eighth aspect, a computer program product is provided. The computer program product includes a computer program (which may also be referred to as code or instructions). When the computer program is run, a computer is enabled to perform the method according to any one of the foregoing aspects and the embodiments of the aspects.

According to a ninth aspect, a computer-readable medium is provided. The computer-readable medium stores a computer program (which may also be referred to as code or instructions). When the computer program is run on a computer, the computer is enabled to perform the method according to any one of the foregoing aspects and the embodiments of the aspects.

According to a tenth aspect, a communication system is provided. The system includes a terminal device and a network device. The terminal device may perform the method according to the first aspect, and the network device may perform the method according to the second aspect.

According to the method provided in the embodiments of this application, the first time-frequency resource overlaps the second time-frequency resource, and the uplink information is transmitted on the second time-frequency resource when the uplink transmission meets the first condition, to prevent a URLLC transmission resource of a UE from being preempted by using a PI triggered by the UE, or prevent a lower-priority URLLC service from preempting a transmission resource of a higher-priority URLLC service, so that reliability of resource preemption by a URLLC service during uplink transmission can be improved.

DESCRIPTION OF EMBODIMENTS

Figure 1:
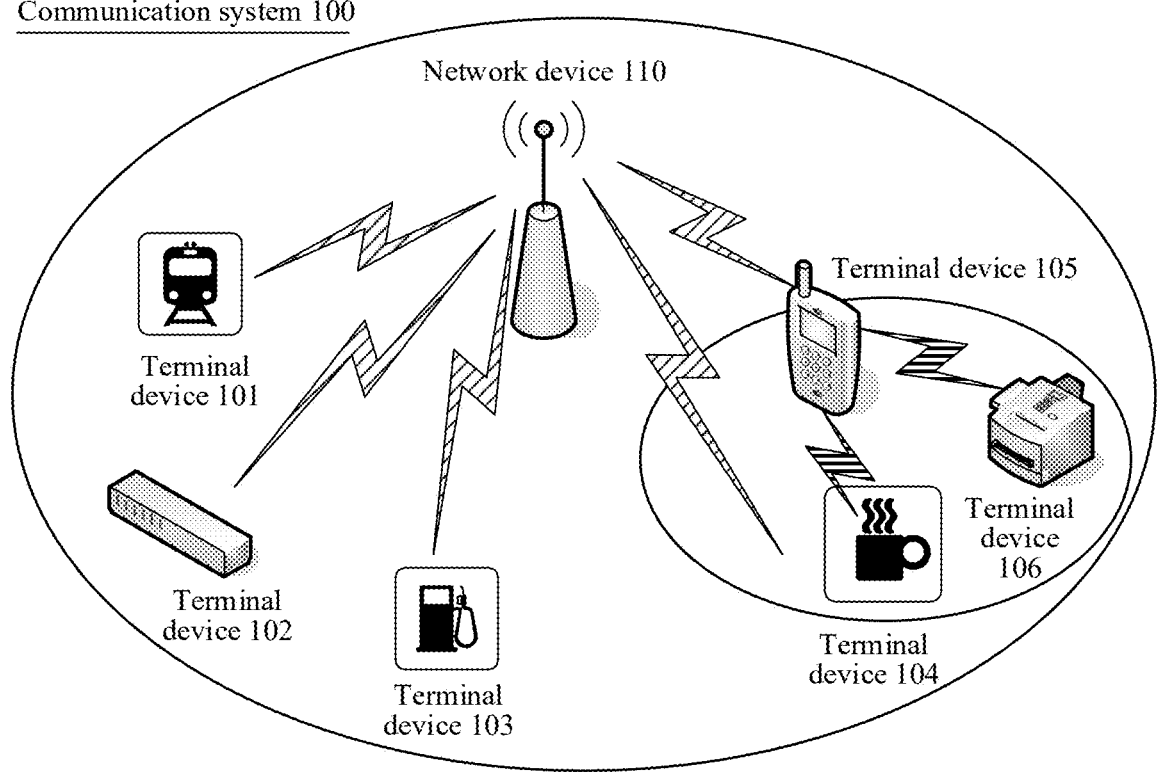
FIG. 1 is an example of an architectural diagram of a communication system to which an embodiment of this application is applicable.

The following describes technical solutions in this application with reference to the accompanying drawings.

The technical solutions in embodiments of this application may be applied to various communication systems, for example, 4th generation (4G) communication systems such as a long term evolution (LTE) system, an LTE frequency division duplex (FDD) system, and an LTE time division duplex (TDD) system, 5th generation (5G) communication systems such as a new radio (NR) system, or other new communication systems such as a next generation (NG) communication system. The 5G mobile communication systems in this application include a non-standalone (NSA) 5G mobile communication system and/or a standalone (SA) 5G mobile communication system.

A terminal device in the embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal device may alternatively be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a drone device, a terminal device in a 5G network, a terminal device in a future evolved public land mobile network (PLMN), or the like. This is not limited in the embodiments of this application. The wearable device may also be referred to as a wearable intelligent device, and is a general term for wearable devices such as glasses, gloves, watches, clothes, and shoes that are developed by applying wearable technologies in intelligent designs of daily wear. The wearable device is a portable device that can be directly worn on the body or integrated into clothes or an accessory of a user. The wearable device is not only a hardware device, but also implements a powerful function through software support, data exchange, and cloud interaction. Generalized wearable intelligent devices include full-featured and large-size devices that can implement complete or partial functions without depending on smartphones, such as smartwatches or smart glasses, and devices that focus on only one type of application function and need to work with other devices such as smartphones, such as various smart bands or smart jewelry for monitoring physical signs.

In the embodiments of this application, the terminal device may alternatively be a terminal device in an internet of things (IoT) system. The IT is an important component in development of future information technologies. A main technical feature of the IoT is to connect an object to a network by using a communication technology, to implement an intelligent network of human-machine interconnection and thing-thing interconnection. In the embodiments of this application, an IoT technology may implement massive connections, deep coverage, and terminal power saving by using, for example, a narrowband (NB) technology. The terminal device may alternatively include sensors such as an intelligent printer, a train detector, or a gas station, and main functions of the terminal device include: collecting data (which is a function of some terminal devices), receiving control information and downlink data of a network device, sending an electromagnetic wave, and transmitting uplink data to the network device.

A network device in the embodiments of this application may be a device configured to communicate with a terminal device, and the network device may be a base station device in an LTE system, namely, an evolved NodeB (eNB/eNodeB); or may be an access network side device in an NR system, where the access network side device includes a gNB, a transmission point (TRP), and the like. The network device may include a central unit (CU) and a distributed unit (DU). The CU may also be referred to as a control unit. A CU-DU structure may be used to split protocol layers of a base station. Functions of some protocol layers are centrally controlled in the CU, and functions of some or all of remaining protocol layers are distributed in the DU. The CU centrally controls the DU.

In the embodiments of this application, the terminal device or the network device includes a hardware layer, an operating system layer running on the hardware layer, and an application layer running on the operating system layer. The hardware layer includes hardware such as a central processing unit (CPU), a memory management unit (MMU), and a memory (which is also referred to as a main memory). The operating system may be any one or more computer operating systems that implement service processing through a process, for example, a Linux operating system, a UNIX operating system, an Android operating system, an iOS operating system, or a Windows operating system. The application layer includes applications such as a browser, an address book, word processing software, and instant messaging software. In addition, a structure of an execution body of a method provided in the embodiments of this application is not particularly limited in the embodiments of this application, provided that a program that records code of the method provided in the embodiments of this application can be run to perform communication according to the method provided in the embodiments of this application. For example, the execution body of the method provided in the embodiments of this application may be the terminal device or the network device, or a functional module that can invoke and execute the program in the terminal device or the network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a radio channel and various other media that can store, include, and/or carry instructions and/or data.

FIG. 1 is an example of an architectural diagram of a communication system 100 to which an embodiment of this application is applicable. The method in the embodiments of this application is applicable to the communication system 100 shown in FIG. 1. It should be understood that the communication system 100 to which the method in the embodiments of this application is applicable may include more or fewer network devices or terminal devices.

A network device or a terminal device in FIG. 1 may be hardware, may be software obtained through functional division, or may be a combination thereof. The network device or the terminal device in FIG. 1 may communicate with each other by using another device or network element.

In the communication system 100 shown in FIG. 1, the communication system 100 includes a network device 110 and terminal devices 101 to 106. In the communication system 100, the network device 110 may send downlink data to the terminal devices 101 to 106. Certainly, the terminal devices 101 to 106 may also send uplink data to the network device 110. It should be understood that each of the terminal devices 101 to 106 may be, for example, a cellular phone, a smartphone, a portable computer, a handheld communication device, a handheld computing device, a satellite radio apparatus, a global positioning system, a PDA, and/or any other appropriate device used for communication in the wireless communication system 100.

The communication system 100 may be a PLMN, a device-to-device (D2D) network, a machine-to-machine (M2M) network, an IoT network, or another network.

In addition, a communication system may alternatively include the terminal devices 104 to 106. In the communication system, the terminal device 105 may send downlink data to the terminal device 104 or the terminal device 106. Correspondingly, the terminal device 104 or the terminal device 106 may also send uplink data to the terminal device 105.

Figure 2:
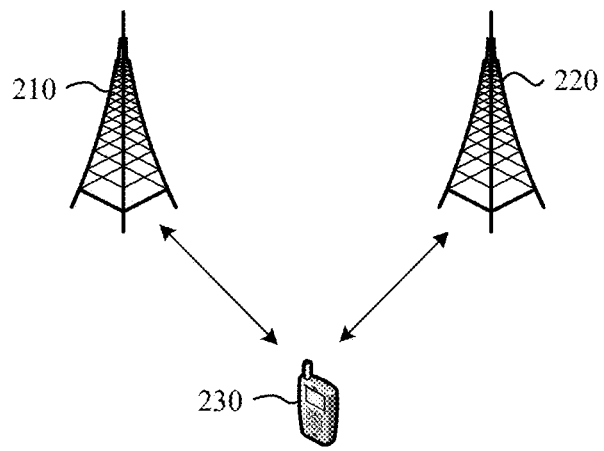
FIG. 2 is an example of an architectural diagram of another communication system to which an embodiment of this application is applicable.

FIG. 2 is an example of an architectural diagram of a communication system 200 to which an embodiment of this application is applicable. As shown in FIG. 2, the communication system 200 may include at least two network devices such as network devices 210 and 220 shown in FIG. 2. The communication system 200 may further include at least one terminal device such as a terminal device 230 shown in FIG. 2. The terminal device 230 may establish a radio link to the network device 210 and the network device 220 by using a dual connectivity (DC) technology or a multi-connectivity technology. The network device 210 may be, for example, a master base station (master gNB, MgNB), and the network device 220 may be, for example, a secondary base station (secondary gNB, SgNB). In this case, the network device 210 is a network device initially accessed by the terminal device 230, and is responsible for radio resource control (RRC) communication with the terminal device 230. The network device 220 may be added during RRC reconfiguration, and is configured to provide an additional radio resource.

Certainly, the network device 220 may alternatively be a master base station, and the network device 210 may alternatively be a secondary base station. This is not limited in this application. In addition, for ease of understanding only, FIG. 2 shows a case in which the two network devices are connected to the terminal device in a wireless manner. However, this should not constitute any limitation on a scenario to which this application is applicable. The terminal device may further establish a radio link with more network devices.

A plurality of antennas may be configured for each communication device, for example, the network device 210, the network device 220, or the terminal device 230 in FIG. 2. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device and the terminal device may communicate with each other by using a multi-antenna technology.

Generally, some URLLC services are bursty, aperiodic, and unpredictable, and spectrum sharing cannot be semi-statically performed between the URLLC services and an eMBB service. Therefore, to improve spectrum resource utilization while ensuring URLLC transmission requirements for a low latency and high reliability, in new radio (NR), dynamic spectrum resource sharing of the URLLC service can be implemented through multiplexing or preemption, that is, a bursty and urgent URLLC service is allowed to preempt a time-frequency resource already allocated to an eMBB service, to perform data transmission, so that a transmission latency of the URLLC service is reduced.

For example, for downlink transmission, a base station sends a preemption indication (PI) to an eMBB UE after scheduling a URLLC service, to indicate that a time-frequency resource previously scheduled for the eMBB UE to perform downlink data transmission is preempted. Correspondingly, after receiving the preemption indication, the eMBB UE clears data received on the time-frequency resource indicated by the preemption indication.

For another example, for uplink transmission, a base station may urgently schedule uplink data transmission of a URLLC UE on an uplink resource previously allocated to an eMBB UE. Correspondingly, to avoid interference from sending of uplink data by the eMBB UE to sending of uplink data by the URLLC UE, the base station sends a preemption indication to the eMBB UE before data is sent, to notify the eMBB UE to stop uplink transmission on a corresponding time-frequency resource.

The foregoing downlink preemption (or downlink multiplexing) or uplink preemption (or uplink multiplexing) is generally referred to as inter-UE preemption (inter-UE MUX). Data transmission of a URLLC UE preempts a transmission resource previously allocated by a base station to an eMBB UE. Correspondingly, the eMBB UE needs to stop transmission (for uplink transmission) or clear received data (for downlink transmission) on the preempted resource. However, because a URLLC service usually occupies relatively large bandwidth, and may simultaneously preempt transmission resources of a plurality of eMBB UEs, the base station usually sends a preemption indication to the plurality of eMBB UEs in a multicast/groupcast manner, that is, sends a common preemption indication to a plurality of users by using one time-frequency resource.

The downlink transmission is used as an example. The preemption indication may be carried in multicasting downlink control information (group-common downlink control information, GC-DCI), and a new radio network temporary identifier (RNTI) is configured for the eMBB UE. For example, the new RNTI may be an INT-RNTI. In this case, the INT-RNTI may be configured for the eMBB UE, and the INT-RNTI may be used to scramble a cyclic redundancy check (CRC) bit of the GC-DCI. All UEs configured with the INT-RNTI receive the GC-DCI sent in a multicast/groupcast manner, and clear, based on an indication by the GC-DCI, data received on a time-frequency resource indicated by the preemption indication. Details are as follows:

(1) the GC-DCI Carries a Downlink Preemption Indication (DL PI):

A DCI format 2_1 is introduced in NR. The DCI format 2_1 is the GC-DCI. A CRC scrambling code bit corresponding to the GC-DCI is determined by using an INT-RNTI, and the INT-RNTI is a cell-level parameter. For all UEs, whether the INT-RNTI is configured for the UEs may be indicated by using corresponding UE-specific higher layer parameters. If the INT-RNTI is configured, the GC-DCI needs to be detected.

(2) GC-DCI Sending:

In NR, both a control resource set (CORESET) identifier (ID) and a search space (SS) ID that are used to send the GC-DCI (the GC-DCI carries the DL PI) are configured by a higher layer. For example, the UE may determine a PDCCH occasion of the GC-DCI based on a higher layer configuration parameter, and perform blind detection on each PDCCH occasion to determine whether there is the GC-DCI (namely, the DCI format 2_1) scrambled by using the INT-RNTI. The PDCCH occasion may also be referred to as a PDCCH monitoring occasion, and the UE may determine, based on the PDCCH occasion, which slots and which symbols are used to receive the GC-DCI.

(3) Preempted Resource Indication by the DL PI:

In NR, a two-level indication method is used for the DL PI. First, the DL PI has a reference region, and the reference region starts from a start symbol of the last PDCCH occasion and ends at a start position of a start symbol of a current PDCCH occasion in time domain, and occupies an entire bandwidth part (BWP) in frequency domain. In addition, a 14-bit bitmap is used in the GC-DCI to indicate resource blocks (RBs) in the reference region that are preempted and symbols on which the resource blocks are located.

(4) DL PI False Alarm:

The bitmap in the DL PI has only 14 bits and cannot precisely indicate a time-frequency resource occupied by a URLLC PDSCH, and an indicated preempted resource usually includes the resource actually occupied by the URLLC PDSCH and some adjacent resources, in other words, a resource range indicated by the DL PI is larger than a resource range occupied by the URLLC PDSCH. Consequently, there may be a case in which PDSCH transmission of the eMBB UE does not overlap URLLC PDSCH transmission but overlaps the preempted resource with a larger range. In this case, the eMBB UE also clears data received on an overlapping time-frequency resource. As a result, the DL PI false alarm is caused, that is, the DL PI falsely indicates some resources that are not preempted, causing a user to clear some data that does not need to be cleared.

(5) UE Behavior:

The eMBB UE should understand that there is no data transmitted on the preempted resource indicated by the DL PI. The DL PI is received after a preemption behavior, that is, the DL PI indicates whether a time-frequency resource between the last PDCCH occasion and the current PDCCH occasion is preempted, but actually, the UE has received data on the preempted resource. Therefore, the UE should actually clear data received on the time-frequency resource.

(6) DL PI Action Range:

In NR, all downlink transmission except a synchronization signal (SS) or a physical broadcast channel (PBCH) on the preempted resource indicated by the DL PI is considered to be "preempted". That is, none of the downlink transmission is performed.

A case in the uplink transmission is similar to that in the downlink transmission. In the uplink transmission, an RNTI may also be configured for the eMBB UE. All UEs configured with the RNTI receive GC-DCI sent in a multicast/groupcast manner, and stop, based on a preemption indication carried in the GC-DCI, performing uplink transmission on a time-frequency resource indicated by the preemption indication.

However, currently, NR can support a hybrid service user (hybrid UE), that is, one UE may simultaneously transmit a URLLC service and an eMBB service. The UE has two types: a URLLC UE, which may be urgently scheduled to preempt a time-frequency resource of another eMBB UE (or hybrid UE); and an eMBB UE, where a resource allocated to the eMBB UE may be preempted by another UE. Therefore, the UE needs to receive a PI, and stops, based on the PI, uplink sending in a preempted time-frequency resource region, or clears received downlink data based on the PI.

In this case, a URLLC transmission resource of the hybrid UE may be preempted by using a PI triggered by the hybrid UE, or a lower-priority URLLC service may preempt a transmission resource of a higher-priority URLLC service.

Figure 3:
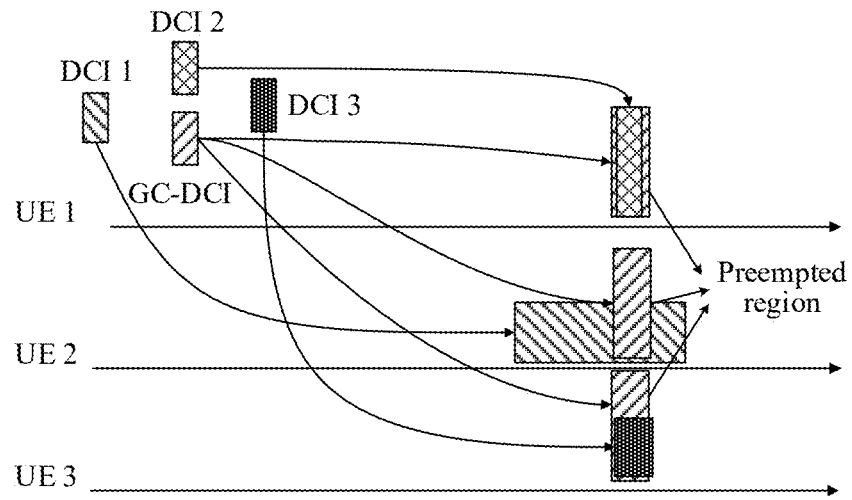
FIG. 3 is a diagram of resource preemption according to an embodiment of this application.

Uplink transmission is used as an example. For example, as shown in FIG. 3, if a UE 1 (Hybrid UE) is urgently scheduled to perform URLLC transmission, and the URLLC transmission preempts a time-frequency resource of a UE 2 (eMBB UE), a base station needs to send a PI to indicate, to the UE 2, a time-frequency resource that is preempted. Because the PI is carried in GC-DCI, and the UE 1 also sends eMBB data, the UE 1 also receives the PI, and stops, based on an indication by the PI, uplink transmission performed in an indicated time-frequency resource region. Consequently, a phenomenon that the UE 1 preempts a resource of the UE 1 occurs, that is, a URLLC transmission resource of the UE 1 is preempted by using the PI triggered by the UE 1. This is definitely unreasonable, and affects reliability of URLLC service transmission.

For another example, as shown in FIG. 3, after the UE 1 is scheduled, a UE 3 (Hybrid UE) may be urgently scheduled to perform URLLC transmission. Correspondingly, the UE 3 also receives the PI triggered by the UE 1. In this case, if the time-frequency resource region indicated by the PI overlaps a URLLC transmission resource of the UE 3, the UE 3 also stops sending URLLC data. However, the URLLC transmission of the UE 3 may have a lower latency and a higher reliability requirement. In other words, the URLLC transmission of the UE 3 may have a higher priority than the URLLC transmission of the UE 1, and should not be stopped, and if the URLLC transmission of the UE 3 is stopped, reliability of the URLLC service transmission is also affected.

Based on the foregoing problem, this application provides a communication method and a communication apparatus, to improve reliability of resource preemption by a URLLC service.

In the embodiments of this application, an example in which a network device is a base station and a terminal device is a UE is used for description.

It should be noted that a quantity of bit fields and locations of the bit fields in each piece of DCI below are not limited in the embodiments of this application. For example, first DCI may include a first bit field and a second bit field. The first bit field may be any bit field in the first DCI, and the second bit field may also be any bit field in the first DCI. In other words, the first bit field and the second bit field may be a same bit field in the first DCI, or the first bit field and the second bit field may be different bit fields in the first DCI. This is not limited in this application. It should be understood that any piece of DCI below in this application is similar to the first DCI in the foregoing example. Details are not described herein again.

Figure 4:
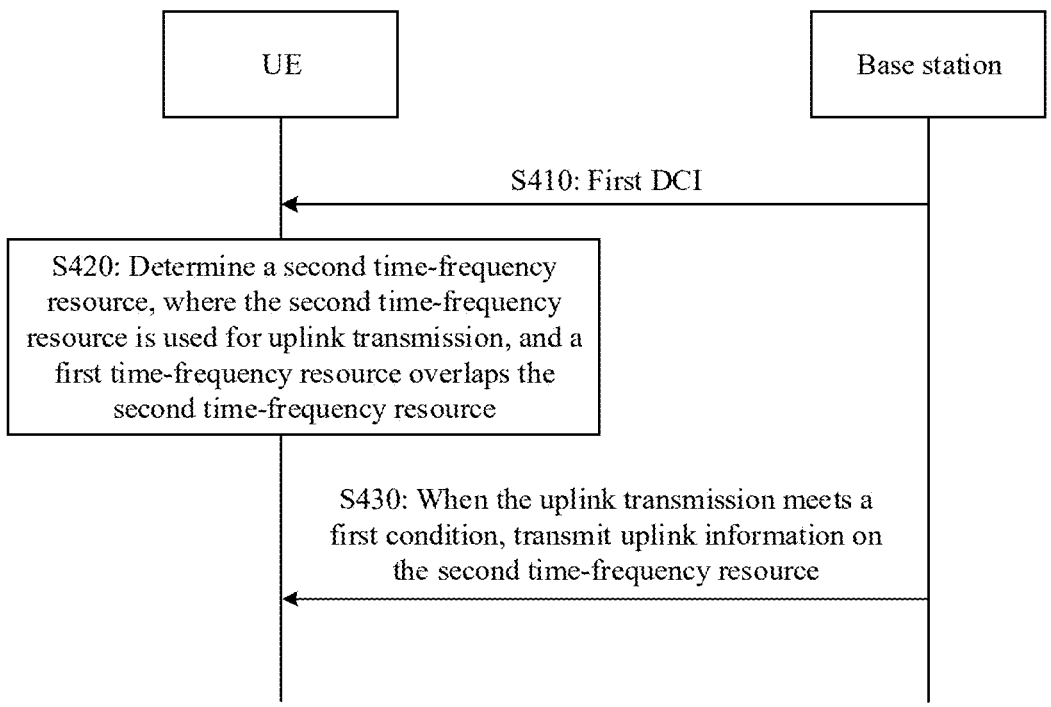
FIG. 4 is a flowchart of a communication method according to an embodiment of this application.

The following describes uplink transmission in detail with reference to FIG. 4. FIG. 4 is a flowchart of a communication method 400 according to an embodiment of this application. It should be understood that FIG. 4 shows steps or operations of the communication method. However, these steps or operations are merely examples. In this embodiment of this application, other operations or variations of the operations in FIG. 4 may be performed, or not all the steps need to be performed, or these steps may be performed in another sequence.

S410: A base station sends first DCI to a UE, where the first DCI is used to indicate a first time-frequency resource.

The first time-frequency resource may include a time domain resource and a frequency domain resource. Alternatively, the first time-frequency resource may include a time domain resource. Alternatively, the first time-frequency resource may include a frequency domain resource.

The first time-frequency resource may include a first group of time-frequency units. The time-frequency unit corresponds to a time domain start position and a time domain length in time domain, and corresponds to a frequency domain start position and a frequency domain length in frequency domain. For example, the time-frequency unit is a resource element (RE), corresponds to one symbol (including a number and a length of the symbol) in time domain, and corresponds to one subcarrier (including a number and a width of the subcarrier) in frequency domain. For another example, the time-frequency unit is a single-symbol resource block, corresponds to one symbol (including a number and a length of the symbol) in time domain, and corresponds to one resource block (including a number and a width of the resource block, where the width of the resource block may be 12 subcarriers) in frequency domain. For another example, the time-frequency unit is a single-slot/sub-slot resource block, corresponds to one slot/sub-slot (including a number and a length of the slot/sub-slot) in time domain, and corresponds to one resource block (including a number and a width of the resource block, where the width of the resource block may be 12 subcarriers) in frequency domain.

Optionally, the first DCI is multicasting downlink control information GC-DCI.

Optionally, the first time-frequency resource may be an uplink time-frequency resource, and is a preempted time-frequency resource. A UE that receives the first DCI needs to stop uplink transmission on the first time-frequency resource under a specific condition.

S420: The UE determines a second time-frequency resource.

The second time-frequency resource is used for uplink transmission, and the first time-frequency resource overlaps the second time-frequency resource.

The second time-frequency resource may include a second group of time-frequency units, and a meaning of the time-frequency unit is the same as that in S410.

Optionally, that the first time-frequency resource overlaps the second time-frequency resource means that the first time-frequency resource overlaps the second time-frequency resource in both time domain and frequency domain, that is, the first time-frequency resource and the second time-frequency resource occupy at least one same time-frequency unit.

Optionally, that the first time-frequency resource overlaps the second time-frequency resource means that the first time-frequency resource overlaps the second time-frequency resource in time domain, that is, the first time-frequency resource and the second time-frequency resource occupy at least one same time domain unit. Optionally, the time domain unit may be a symbol, or a slot/sub-slot.

Optionally, that the first time-frequency resource overlaps the second time-frequency resource may mean that the first time-frequency resource partially overlaps the second time-frequency resource, or may mean that the first time-frequency resource completely overlaps the second time-frequency resource. This is not limited in this application.

S430: When the uplink transmission meets a first condition, the UE transmits uplink information to the base station on the second time-frequency resource.

The second time-frequency resource is used for the uplink transmission, and the uplink information is carried on the second time domain resource. Alternatively, this means: The uplink information is data or a signal that the UE originally needs to send on the second time-frequency resource, and the uplink transmission means that the UE transmits the uplink information to the base station on the second time-frequency resource.

Correspondingly, the base station receives, on the second time-frequency resource, the uplink information sent by the UE.

According to the method in FIG. 4, the first time-frequency resource overlaps the second time-frequency resource, and the uplink information is transmitted on the second time-frequency resource when the uplink transmission meets the first condition, to prevent a URLLC transmission resource of the UE from being preempted by using a PI triggered by the UE, or prevent a lower-priority URLLC service from preempting a transmission resource of a higher-priority URLLC service, so that reliability of resource preemption by a URLLC service during uplink transmission can be improved.

Optionally, when the uplink transmission does not meet the first condition, the UE does not transmit the uplink information to the base station on an overlapping time-frequency resource between the second time-frequency resource and the first time-frequency resource. Optionally, the overlapping time-frequency resource between the second time-frequency resource and the first time-frequency resource may be a time-frequency unit occupied by both the second time-frequency resource and the first time-frequency resource.

Optionally, when the uplink transmission does not meet the first condition, the UE does not transmit the uplink information to the base station on an overlapping time-frequency unit between the second time-frequency resource and the first time-frequency resource. Correspondingly, the base station does not receive, on the overlapping time-frequency unit between the second time-frequency resource and the first time-frequency resource, the uplink information sent by the UE. In this case, the base station may receive URLLC transmission data (the URLLC transmission data is not the uplink information) on the overlapping time domain unit between the second time-frequency resource and the first time-frequency resource. The URLLC transmission data may be sent by the UE, or may be sent by another UE. This is not limited herein.

Optionally, when the uplink transmission does not meet the first condition, the UE does not transmit the uplink information to the base station on the second time-frequency resource. In this case, the base station may receive URLLC transmission data (the URLLC transmission data is not the uplink information) on the second time-frequency resource. The URLLC transmission data may be sent by the UE, or may be sent by another UE. This is not limited herein.

Optionally, when the uplink transmission does not meet the first condition, the UE does not transmit the uplink information to the base station on an overlapping time domain unit between the second time-frequency resource and the first time-frequency resource and a time domain unit that is after the first time-frequency resource and that belongs to the second time-frequency resource. In this case, the base station may receive URLLC transmission data (the URLLC transmission data is not the uplink information) on the overlapping time domain unit between the second time-frequency resource and the first time-frequency resource and the time domain unit that is after the first time-frequency resource and that belongs to the second time-frequency resource. The URLLC transmission data may be sent by the UE, or may be sent by another UE.

This is not limited herein.

In this embodiment of this application, there may be the following several cases based on different first conditions. Case 1:

In a possible implementation, the uplink transmission is dynamically scheduled uplink transmission. For example, the uplink transmission is scheduled by using second DCI.

Optionally, the first condition is that a sending moment of the first DCI is not later than a sending moment of the second DCI. Optionally, a sending moment of DCI refers to the first symbol or the last symbol occupied by a downlink control channel carrying the DCI.

For example, the uplink transmission may be a dynamically scheduled uplink data channel, for example, a dynamic physical uplink shared channel (dynamic PUSCH), and the second DCI is used to schedule the uplink data channel.

Optionally, the dynamically scheduled uplink data channel may be used to send only uplink data. Alternatively, the dynamically scheduled uplink data channel may be used to send only aperiodic CSI. Alternatively, the dynamically scheduled uplink data channel may be used to send both uplink data and aperiodic CSI.

For another example, the uplink transmission may be a dynamically scheduled uplink control channel, and the second DCI is used to schedule the uplink control channel.

Optionally, the dynamically scheduled uplink control channel may carry feedback information, namely, a hybrid automatic repeat request acknowledgment/negative acknowledgment (HARQ ACK/NACK) message, of a dynamically scheduled downlink data channel; or the dynamically scheduled uplink control channel may carry a dynamically triggered aperiodic channel state information (aperiodic CSI, A-CSI) report. The second DCI is used to schedule the downlink data channel or trigger the A-CSI report.

For another example, the uplink transmission may be a dynamically scheduled uplink sounding reference signal, and the second DCI is used to schedule the uplink sounding reference signal. Optionally, the second DCI may be multicasting DCI.

For another example, the uplink transmission may be a dynamically activated uplink data channel, for example, a Type-2 configured grant uplink data channel (Type-2 configured PUSCH, also referred to as a semi-persistent scheduling uplink data channel), or the first transmission of the Type-2 configured PUSCH, and the second DCI is used to activate the Type-2 configured PUSCH.

For another example, the uplink transmission may be feedback information of a semi-persistent scheduling downlink data channel or feedback information of the first transmission of the semi-persistent scheduling downlink data channel. That is, the uplink transmission may be an uplink control channel carrying the feedback information of the semi-persistent scheduling downlink data channel, or an uplink control channel carrying the feedback information of the first transmission of the semi-persistent scheduling downlink data channel. The second DCI is used to activate the semi-persistent scheduling downlink data channel.

In another possible implementation, the second uplink transmission is configured uplink transmission.

Optionally, the first condition includes: the second uplink transmission is not configured uplink transmission, that is, when the second uplink transmission is the configured uplink transmission, the first condition is not met. The uplink transmission includes at least one of a configured grant uplink data channel, a configured uplink control channel, an uplink control channel carrying HARQ-ACK feedback information of semi-persistent scheduling downlink data transmission, a configured uplink sounding reference signal (SRS), or a configured physical random access channel (PRACH). The configured uplink control channel includes at least one of an uplink control channel carrying a scheduling request or an uplink control channel carrying periodic channel state information (P-CSI) or semi-persistent channel state information SP-CSI).

The configured grant uplink data channel may be Type-1 configured grant uplink transmission (a Type-1 configured PUSCH), a Type-2 configured PUSCH, or non-first transmission of the Type-2 configured PUSCH. The semi-persistent scheduling downlink data transmission may be non-first transmission of the semi-persistent scheduling downlink data transmission.

Optionally, the first condition is that the uplink transmission is at least one of a configured grant uplink data channel, an uplink control channel carrying a scheduling request, or a configured physical random access channel (PRACH). The configured grant uplink data channel may be Type-1 configured grant uplink transmission (a Type-1 configured PUSCH) or non-first transmission of Type-2 configured grant uplink transmission (a Type-2 configured PUSCH). The configured grant uplink data channel may be a grant-free physical uplink shared channel (GF PUSCH).

According to the method in Case 1, the first condition is that the sending moment of the first DCI is not later than the sending moment of the second DCI, and the UE may determine, based on the first condition, whether to transmit the uplink information on the second time-frequency resource. Therefore, according to the method provided in this application, a more appropriate transmission decision can be achieved during uplink transmission, to ensure that uplink transmission of a URLLC user does not preempt a resource of previous uplink transmission of the URLLC user or a resource of subsequently scheduled higher-priority URLLC transmission.

Case 2:

In a possible implementation, the uplink transmission is scheduled by using third DCI, and the uplink transmission includes at least one of a dynamically scheduled uplink data channel, a dynamically scheduled uplink control channel, a dynamically scheduled uplink sounding reference signal, a dynamically activated uplink data channel, or feedback information of a dynamically activated downlink data channel.

The dynamically scheduled uplink control channel includes at least one of an uplink control channel carrying feedback information of a dynamically scheduled downlink data channel and an uplink control channel carrying a dynamically triggered A-CSI report. The dynamically activated uplink data channel includes a Type-2 configured PUSCH or the first transmission of the Type-2 configured PUSCH, and the third DCI is used to activate the Type-2 configured PUSCH. The feedback information of the dynamically activated downlink data channel may be feedback information of the first transmission of a semi-persistent scheduling downlink data channel.

Optionally, the first condition includes at least one of the following:

(1) A value of a first bit field in the third DCI belongs to a first set, where the first set is predefined or is configured by using a higher layer parameter.

Optionally, the first bit field is directly used to indicate a value of a priority of the uplink transmission. Optionally, a width of the first bit field may be one bit. For example, if the value of the first bit field is 0, it indicates that transmission scheduled/activated by using the DCI is high-priority transmission. Correspondingly, the first condition is that the value of the first bit field is 0.

Optionally, the first bit field indirectly indicates a value of a priority of the uplink transmission. For example, the first bit field indicates a configuration identifier of the Type-2 configured PUSCH or the semi-persistent scheduling downlink data channel, and the configuration identifier is associated with a determined priority value. For another example, the first bit field indicates codebook information in which the feedback information of the dynamically scheduled or dynamically activated downlink data channel is located, and the codebook information is associated with determined priority information.

(2) The third DCI is in a first format, where the first format is a DCI format that is configured by a higher layer and that corresponds to a smallest DCI payload size in a plurality of DCI formats for scheduling data transmission.

The first format is predefined or is configured by using a higher layer parameter.

For example, the first format is a DCI format for scheduling uplink data transmission, and is neither a DCI format 0_0 nor a DCI format 0_1 in NR. Optionally, a quantity of DCI bits in the first format is less than a quantity of DCI bits in the DCI format 0_0 or the DCI format 0_1.

Optionally, the first format is indicated by a second bit field in the third DCI, and the first format is used to schedule URLLC data transmission.

(3) A value of a radio network temporary identifier (RNTI) of the third DCI is a first RNTI.

The first RNTI is predefined or is configured by using a higher layer parameter.

Optionally, the first RNTI may be a modulation and coding scheme-cell radio network temporary identifier (MCS-C-RNTI), a configured scheduling radio network temporary identifier (CS-RNTI), or the like.

It should be understood that, in this application, an RNTI corresponding to DCI is an RNTI used to scramble a cyclic redundancy check (CRC) bit sequence of the DCI.

Alternatively, the first RNTI may be different from an existing RNTI in NR, and the first RNTI corresponds to URLLC data transmission, that is, DCI scrambled by using the first RNTI is used to schedule the URLLC data transmission.

(4) An identifier of a search space in which the third DCI is located belongs to a second set.

The second set is predefined or is configured by using a higher layer parameter.

(5) An identifier of a control resource set in which the third DCI is located belongs to a third set.

The third set is predefined or is configured by using a higher layer parameter.

(6) The uplink transmission is an uplink data channel, and a logical channel priority associated with the uplink data channel is greater than or equal to a first threshold, or a logical channel identifier (or priority) associated with the uplink data channel belongs to a fourth set. The first threshold or the fourth set is predefined or is configured by using a higher layer parameter. A logical channel associated with the uplink data channel means that data on the logical channel may be carried on the uplink data channel.

In another possible implementation, the uplink transmission is configured by using a first higher layer parameter, and the uplink transmission includes at least one of a configured grant uplink data channel, feedback information of a semi-persistent scheduling downlink data channel, a configured uplink control channel, or a configured uplink sounding reference signal. The configured uplink control channel includes at least one of an uplink control channel carrying a scheduling request or an uplink control channel carrying a P-CSI report or an SP-CSI report. Correspondingly, the first higher layer parameter is a configuration parameter of the configured grant uplink data channel, a configuration parameter of the semi-persistent scheduling downlink data channel, a configuration parameter of the scheduling request, a configuration parameter of the P-CSI report or the SP-CSI report, or a configuration parameter of the configured uplink sounding reference signal.

The configured grant uplink data channel may be a Type-1 configured PUSCH, a Type-2 configured PUSCH, or non-first transmission of the Type-2 configured PUSCH. The feedback information of the semi-persistent scheduling downlink data channel may be feedback information of non-first transmission of the semi-persistent scheduling downlink data channel.

Optionally, the first condition includes at least one of the following:

(1) A configuration identifier in the first higher layer parameter belongs to a fifth set.

The fifth set is predefined or is configured by using a higher layer parameter.

For example, the uplink transmission is the configured grant uplink data channel, the first higher layer parameter includes a configuration identifier (or index) of the configured grant uplink data channel, and a value of the identifier belongs to the fifth set when the first condition is met. Optionally, for the configured grant uplink data channel, the first higher layer parameter includes both the configuration identifier and a priority indication, the fifth set is an identifier set corresponding to a first preset value of the priority indication, and the first preset value is used to indicate that the configured grant uplink data channel has a high priority.

Similarly, the uplink transmission is the uplink control channel carrying the scheduling request, the first higher layer parameter includes a configuration identifier of the scheduling request, and a value of the identifier belongs to the fifth set when the first condition is met. Optionally, for the scheduling request, the first higher layer parameter includes both the configuration identifier and a priority indication, the fifth set is an identifier set corresponding to a first preset value of the priority indication, and the first preset value is used to indicate that the configured grant uplink data channel has a high priority.

(2) A transmission periodicity in the first higher layer parameter is less than or equal to a second threshold.

The second threshold is predefined or is configured by using a higher layer parameter.

For example, the second threshold may be 2 or 7.

(3) A transmission length in the first higher layer parameter is less than or equal to a third threshold.

The third threshold is predefined or is configured by using a higher layer parameter.

For example, the third threshold may be 2, 4, or 7.

(4) A logical channel priority associated with the uplink transmission is greater than or equal to a fourth threshold, or a logical channel identifier or priority associated with the uplink transmission belongs to a sixth set, where the fourth threshold or the sixth set is predefined or is configured by using a higher layer parameter.

In this case, the uplink transmission may be the configured grant uplink data channel or the scheduling request (SR). A logical channel associated with the configured grant uplink data channel means that data on the logical channel may be carried on the uplink data channel. A logical channel associated with the scheduling request is a logical channel associated with the logical channel identifier, and a scheduling request corresponding to the identifier is triggered after data arrives on these logical channels.

(5) An effective coding rate indicated by the first higher layer parameter is less than or equal to a fifth threshold.

In this case, the uplink transmission may be the configured grant uplink data channel or the feedback information of the semi-persistent scheduling downlink data channel. The effective coding rate is determined by using a modulation and coding scheme (MCS) indicated by the first higher layer parameter.

(6) The uplink transmission is a short-format uplink control channel.

For example, the uplink transmission is in a PUCCH format 0.

Optionally, in this case, the uplink transmission may be the SR.

According to the method in Case 2, it may be determined that the uplink transmission that meets the first condition is URLLC transmission. In this case, the UE transmits the uplink information on the second time-frequency resource, to prevent a transmission resource of a URLLC service from being preempted by using a UL PI, so that reliability of resource preemption by the URLLC service during uplink transmission can be improved.

Case 3:

In a possible implementation, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The dynamically scheduled uplink control channel includes at least one of an uplink control channel carrying feedback information of a dynamically scheduled downlink data channel and an uplink control channel carrying a dynamically triggered aperiodic channel state information report. The dynamically activated uplink data channel includes a Type-2 configured PUSCH or the first transmission of the Type-2 configured PUSCH, and the fourth DCI is used to activate the Type-2 configured PUSCH. The feedback information of the dynamically activated downlink data channel may be feedback information of the first transmission of a semi-persistent scheduling downlink data channel.

For the uplink data channel, a priority of the uplink data channel may be determined based on a logical channel priority associated with the uplink data channel.

Optionally, the first condition is that a priority of the uplink transmission is greater than or equal to a first priority.

The first priority is indicated by the first DCI, and the priority of the uplink transmission is indicated by the fourth DCI. Optionally, the priority of the uplink transmission may be explicitly and directly indicated by the fourth DCI. For example, the fourth DCI includes a first bit field, and the first bit field explicitly indicates the priority of the scheduled or activated uplink transmission.

Optionally, the priority of the uplink transmission may be explicitly and indirectly indicated by the fourth DCI. For example, the fourth DCI includes a second bit field. The second bit field explicitly indicates a configuration identifier of the Type-2 configured PUSCH or a configuration identifier of the semi-persistent scheduling downlink data channel, and the configuration identifier is associated with determined priority information. For another example, the second bit field explicitly indicates a codebook identifier of feedback information of a dynamically scheduled or semi-persistent scheduling downlink data channel, and the codebook identifier is associated with determined priority information.

Optionally, the priority of the uplink transmission may be implicitly indicated by the fourth DCI, for example, implicitly indicated by a format, an RNTI, a control resource set, or a search space of the fourth DCI.

In another possible implementation, the uplink transmission is configured by using a second higher layer parameter, and the uplink transmission includes at least one of a configured grant uplink data channel, feedback information of a semi-persistent scheduling downlink data channel, a configured uplink control channel, or a configured uplink sounding reference signal. The configured uplink control channel includes at least one of an uplink control channel carrying a scheduling request or an uplink control channel carrying a P-CSI report or an SP-CSI report. The second higher layer parameter is a configuration parameter of the configured grant uplink data channel, a configuration parameter of the semi-persistent scheduling downlink data channel, a configuration parameter of the scheduling request, a configuration parameter of the P-CSI report or the SP-CSI report, or a configuration parameter of the configured uplink sounding reference signal.

For the configured grant uplink data channel, a priority of the uplink data channel may be determined based on a logical channel priority associated with the uplink data channel. For the SR, a priority of the SR may be determined based on a logical channel priority associated with the SR. For example, there is a preset correspondence between a priority of the uplink transmission and a logical channel identifier or the logical channel priority associated with the uplink data channel or the SR. For example, the priority has N values, logical channels are divided into N sets, and the N sets respectively correspond to the N values of the priority, where N is an integer.

Optionally, the first condition is that a priority of the uplink transmission is greater than or equal to a first priority, the first priority is indicated by the first DCI, and the priority of the uplink transmission is determined by using at least one of the following information:

a configuration identifier in the second higher layer parameter, a transmission periodicity in the second higher layer parameter, or a transmission length in the second higher layer parameter.

According to the method in Case 3, when the priority of the uplink transmission is greater than or equal to the first priority, the UE transmits the uplink information on the second time-frequency resource, to prevent a lower-priority URLLC service from preempting a transmission resource of a higher-priority URLLC service, so that reliability of resource preemption by a URLLC service during uplink transmission can be improved.

Figure 5:
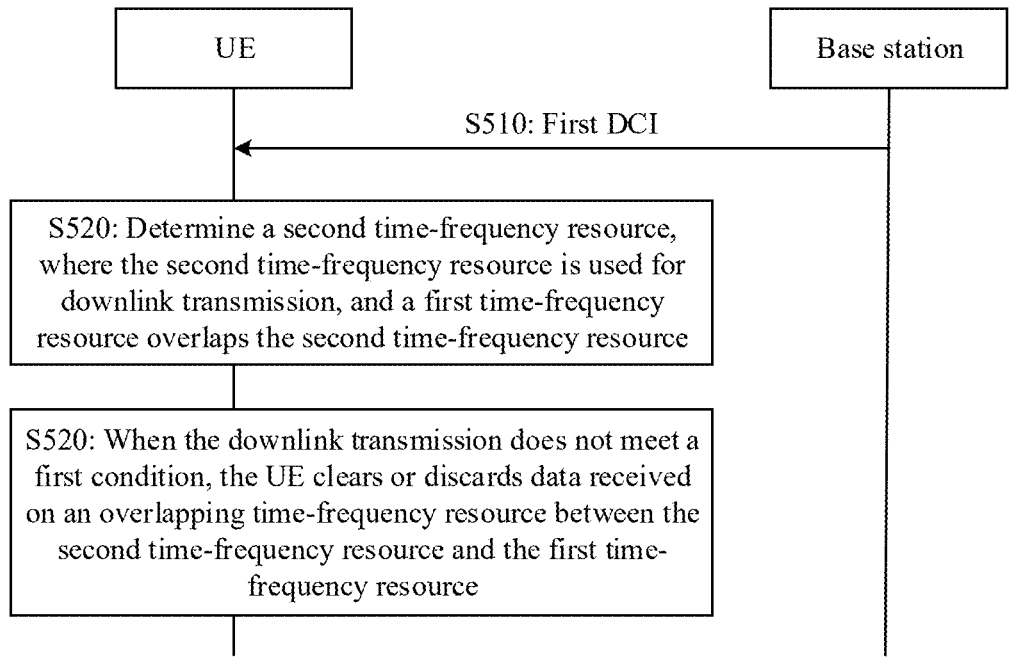
FIG. 5 is a flowchart of a communication method according to another embodiment of this application.

The following describes downlink transmission in detail with reference to FIG. 5. FIG. 5 is a flowchart of a communication method 500 according to an embodiment of this application.

S510: A base station sends first DCI to a UE.

The first DCI is used to indicate a first time-frequency resource.

Optionally, the first DCI is multicasting downlink control information GC-DCI.

Optionally, the first time-frequency resource may be a downlink time-frequency resource, and is a preempted time-frequency resource. A user that receives the first DCI needs to clear data received on the first time-frequency resource, to avoid buffer pollution. The first time-frequency resource includes a first group of time-frequency units, and a meaning of the time-frequency unit is the same as that in S410.

S520: The UE determines a second time-frequency resource.

The second time-frequency resource is used for downlink transmission, and the first time-frequency resource overlaps the second time-frequency resource. The second time-frequency resource includes a second group of time-frequency units, and a meaning of the time-frequency unit is the same as that in S410.

Optionally, a meaning of overlapping between the first time-frequency resource and the second time-frequency resource is the same as that in S420, and details are not described herein again.

S530: When the downlink transmission does not meet a first condition, the UE clears or discards data received on an overlapping time-frequency resource between the second time-frequency resource and the first time-frequency resource.

According to the method in FIG. 5, the first time-frequency resource overlaps the second time-frequency resource, and downlink information is normally received on the second time-frequency resource when the downlink transmission meets the first condition, to prevent URLLC transmission data of the UE from being cleared by using a PI triggered by the UE, or prevent transmission data of a higher-priority URLLC service from being cleared due to a lower-priority URLLC service, so that reliability of resource preemption by a URLLC service during downlink transmission can be improved.

In this embodiment of this application, there may be the following several cases based on different first conditions.

Case 1:

In a possible implementation, the downlink transmission is scheduled by using second DCI, and the downlink transmission includes at least one of a dynamically scheduled downlink data channel or a dynamically activated downlink data channel. The dynamically activated downlink data channel is a semi-persistent scheduling downlink data channel or the first transmission of the semi-persistent scheduling downlink data channel.

Optionally, the first condition includes at least one of the following:

(1) A value of a first bit field in the second DCI belongs to a first set, where the first set is predefined or is configured by using a higher layer parameter.

Optionally, the first bit field directly indicates a value of a priority of the downlink transmission. Optionally, the first bit field may be one bit. For example, if the value of the first bit field is 0, it indicates that transmission scheduled/activated by using the DCI is high-priority transmission. Correspondingly, the first condition is that the value of the first bit field is 0.

Optionally, the first bit field indirectly indicates a value of a priority of the downlink transmission. For example, the first bit field indicates a configuration identifier of the dynamically activated downlink data channel (the semi-persistent scheduling downlink data channel), and the configuration identifier is associated with a determined priority value. For another example, the first bit field indicates codebook information in which feedback information of the dynamically scheduled or dynamically activated downlink data channel is located, and the codebook information is associated with determined priority information.

(2) The second DCI is in a first format, where the first format is a DCI format that is configured by a higher layer and that corresponds to a smallest DCI payload size in a plurality of DCI formats for scheduling data transmission.

The first format is predefined or is configured by using a higher layer parameter.

For example, the first format is a DCI format for scheduling uplink data transmission, and is neither a DCI format 0_0 nor a DCI format 0_1 in NR. Optionally, a quantity of DCI bits in the first format is less than a quantity of DCI bits in the DCI format 0_0 or the DCI format 0_1.

Optionally, the first format is indicated by a second bit field in the second DCI, and the first format is used to schedule URLLC data transmission.

(3) A value of an RNTI of the second DCI is a first RNTI, where the first RNTI is a modulation and coding scheme-cell radio network temporary identifier MCS-C-RNTI.

The first RNTI is predefined or is configured by using a higher layer parameter.

Optionally, the first RNTI may be the modulation and coding scheme-cell radio network temporary identifier (MCS-C-RNTI), a configured scheduling radio network temporary identifier (CS-RNTI), or the like.

It should be understood that, in this application, an RNTI corresponding to DCI is an RNTI used to scramble a cyclic redundancy check (CRC) bit sequence of the DCI.

Alternatively, the first RNTI may be different from an existing RNTI in NR, and the first RNTI corresponds to URLLC data transmission, that is, DCI scrambled by using the first RNTI is used to schedule the URLLC data transmission.

(4) A number of a search space in which the second DCI is located belongs to a second set.

The second set is predefined or is configured by using a higher layer parameter.

(5) A number of a control resource set in which the second DCI is located belongs to a third set.

The third set is predefined or is configured by using a higher layer parameter.

In another possible implementation, the downlink transmission is configured by using a first higher layer parameter, and the downlink transmission includes a semi-persistent scheduling downlink data channel or non-first transmission of the semi-persistent scheduling downlink data channel. Correspondingly, the first higher layer parameter is a configuration parameter of the semi-persistent scheduling downlink data channel.

Optionally, the first condition includes at least one of the following:

(1) A configuration identifier in the first higher layer parameter belongs to a fourth set.

The fourth set is predefined or is configured by using a higher layer parameter. Optionally, for the semi-persistent scheduling downlink data channel, the first higher layer parameter includes both the configuration identifier and a priority indication, the fourth set is an identifier set corresponding to a first preset value of the priority indication, and the first preset value is used to indicate that the configured grant uplink data channel has a high priority.

(2) A transmission periodicity in the first higher layer parameter is less than or equal to a first threshold.

The first threshold is predefined or is configured by using a higher layer parameter.

For example, the first threshold may be 2 or 7.

(3) A transmission length in the first higher layer parameter is less than or equal to a second threshold.

The second threshold is predefined or is configured by using a higher layer parameter.

For example, the second threshold may be 2, 4, or 7.

(4) An effective coding rate indicated by the first higher layer parameter is less than or equal to a fourth threshold.

The effective coding rate is determined by using a modulation and coding scheme (MCS) indicated by the first higher layer parameter.

According to the method in Case 1, it may be determined that the downlink transmission that meets the first condition is URLLC transmission. In this case, the UE transmits the downlink information on the second time-frequency resource, to prevent transmission data of a URLLC service from being cleared by using a DL PI, so that reliability of resource preemption by the URLLC service during downlink transmission can be improved.

Case 2:

In a possible implementation, the downlink transmission is scheduled by using third DCI, and the downlink transmission includes at least one of a dynamically scheduled downlink data channel or a dynamically activated downlink data channel. The dynamically activated downlink data channel is a semi-persistent scheduling downlink data channel or the first transmission of the semi-persistent scheduling downlink data channel.

Optionally, the first condition is that a priority of the uplink transmission is greater than or equal to a first priority.

The first priority is indicated by the first DCI, and the priority of the uplink transmission is indicated by the third DCI. Optionally, the priority of the uplink transmission may be explicitly and directly indicated by the third DCI. For example, the third DCI includes a first bit field, and the first bit field explicitly indicates the priority of the scheduled or activated downlink transmission.

Optionally, the priority of the downlink transmission may be explicitly and indirectly indicated by the third DCI. For example, the third DCI includes a second bit field, the second bit field explicitly indicates a configuration identifier of the dynamically activated downlink data channel, and the configuration identifier is associated with determined priority information. For another example, the second bit field explicitly indicates a codebook identifier of feedback information of the dynamically scheduled or dynamically activated downlink data channel, and the codebook identifier is associated with determined priority information.

Optionally, the priority of the downlink transmission may be implicitly indicated by the third DCI, for example, implicitly indicated by a format, an RNTI, a control resource set, or a search space of the third DCI.

In another possible implementation, the uplink transmission is configured by using a second higher layer parameter, and the uplink transmission includes a semi-persistent scheduling downlink data channel or non-first transmission of the semi-persistent scheduling downlink data channel. Correspondingly, the second higher layer parameter is a configuration parameter of the semi-persistent scheduling downlink data channel.

Optionally, the first condition is that a priority of the downlink transmission is greater than or equal to a first priority, the first priority is indicated by the first DCI, and the priority of the downlink transmission is determined by using at least one of the following information:

a configuration identifier in the second higher layer parameter, a transmission periodicity in the second higher layer parameter, or a transmission length in the second higher layer parameter.

According to the method in Case 2, when the priority of the downlink transmission is greater than or equal to the first priority, the UE transmits the downlink information on the second time-frequency resource, to prevent transmission data of a higher-priority URLLC service from being cleared due to a lower-priority URLLC service, so that reliability of resource preemption by a URLLC service during downlink transmission can be improved.

Figure 6:
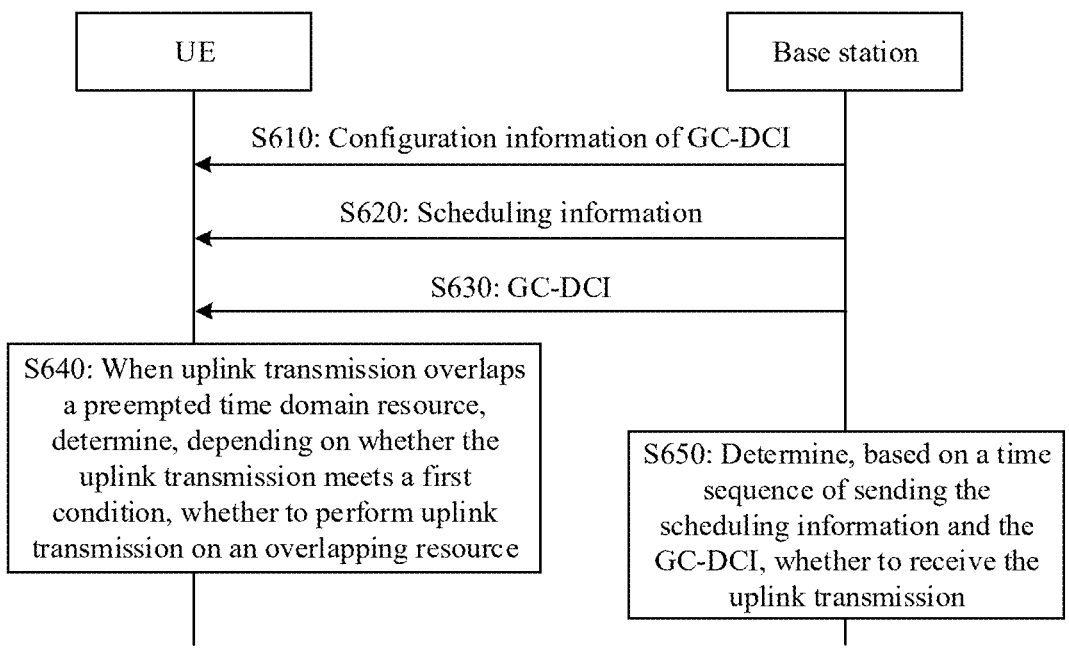
FIG. 6 is a flowchart of a communication method according to another embodiment of this application.
Figure 7:
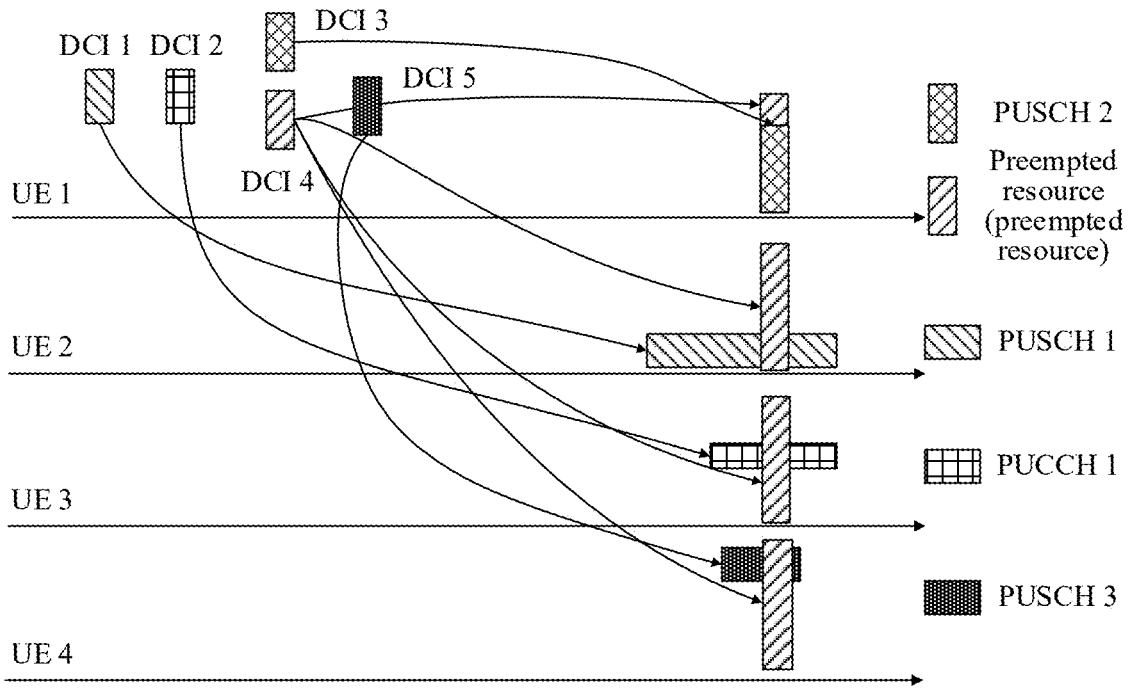
FIG. 7 is a diagram of resource preemption according to another embodiment of this application.
Figure 8:
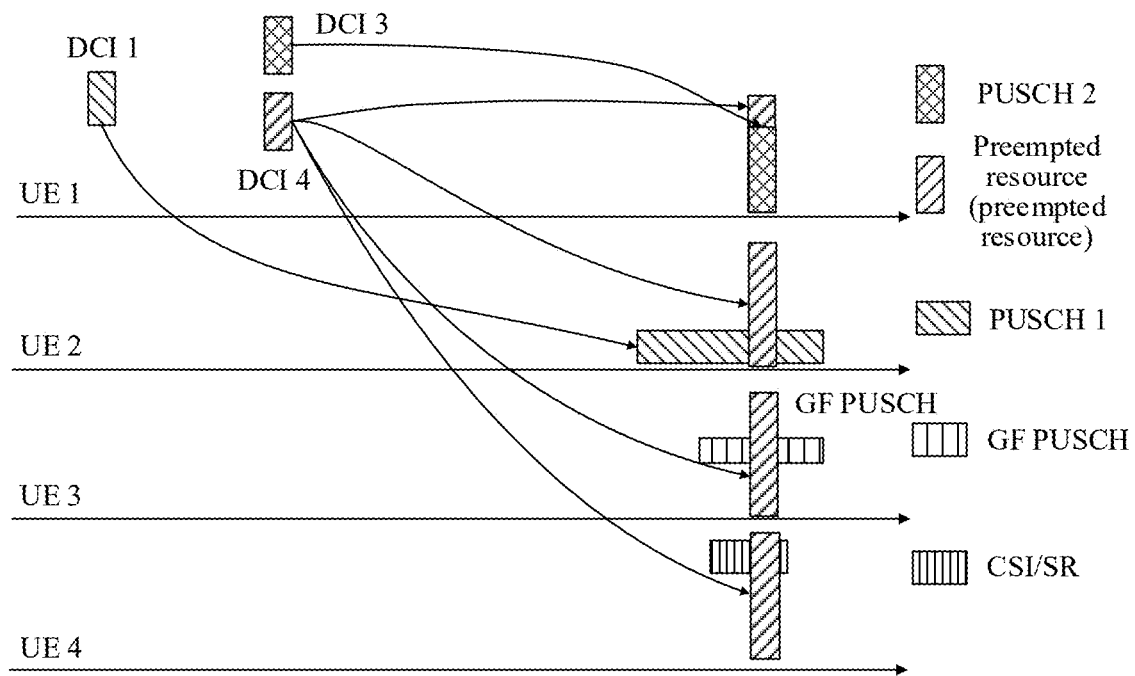
FIG. 8 is a diagram of resource preemption according to another embodiment of this application.

The following describes Case 1 in the method 400 in FIG. 4 in detail with reference to FIG. 6, FIG. 7, and FIG. 8.

FIG. 6 is a flowchart of a communication method 600 according to an embodiment of this application.

S610: A base station sends configuration information of GC-DCI to a UE.

The configuration information of the GC-DCI may include sending position information of the GC-DCI that carries an uplink preemption indication (UL PI), scrambling RNTI information of the GC-DCI, and the like. Optionally, the RNTI herein may be an RNTI corresponding to the GC-DCI, or an RNTI specially set for the GC-DCI, for example, a UL PI-RNTI.

As shown in FIG. 7, four UEs (a UE 1, a UE 2, a UE 3, and a UE 4) in FIG. 7 may all transmit eMBB service data. Therefore, all the four UEs monitor the UL PI. Correspondingly, the base station sends the configuration information of the GC-DCI to all the four UEs.

S620: The base station sends scheduling information to the UE.

For example, as shown in FIG. 7, the base station may separately send the scheduling information to the UE 1 to the UE 4, to schedule uplink transmission corresponding to each UE. It should be understood that FIG. 7 is merely an example but not a limitation.

For the UE 2 in FIG. 7, the base station sends DCI 1 at a moment t1, to schedule a PUSCH 1 for the UE 2. Correspondingly, the UE 2 detects the DCI 1 at the moment t1, determines that the base station has scheduled the PUSCH 1 for the UE 2, and determines a position of a time-frequency resource of the PUSCH 1. The moment t1 herein is equivalent to the first PDCCH occasion shown in FIG. 7.

For the UE 3 in FIG. 7, the base station sends DCI 2 at a moment t2 to schedule a PDSCH for the UE 3, and indicates the UE 3 to feed back, on a PUCCH 1, a HARQ-ACK corresponding to the PDSCH. Correspondingly, the UE 3 detects the DCI 2 at the moment t2, and determines that the base station has scheduled the PDSCH for the UE 3 and indicates the UE 3 to feed back the HARQ-ACK on the PUCCH 1. The UE 3 determines a position of a time-frequency resource of the PUCCH 1. The moment t2 herein is equivalent to the second PDCCH occasion shown in FIG. 7.

For the UE 1 in FIG. 7, the base station receives, before a moment t3, an urgent scheduling request (SR) sent by the UE 1. In this case, the base station knows that the UE 1 needs to transmit urgent URLLC data. Therefore, the base station sends DCI 3 at the moment t3, to schedule an urgent PUSCH 2 for the UE 1, where the PUSCH 2 preempts a part of the time-frequency resources of the PUSCH 1 and the PUCCH 1. Correspondingly, the UE 1 detects the DCI 3 at the moment t3, determines that the base station has scheduled the PUSCH 2 for the UE 1, and determines a position of a time-frequency resource of the PUSCH 2. The moment t3 herein is equivalent to the third PDCCH occasion shown in FIG. 7.

For the UE 4 in FIG. 7, the base station sends DCI 5 at a moment t4, to schedule a PUSCH 3 for the UE 4. Correspondingly, the UE 4 detects the DCI 5 at the moment t4, determines that the base station has scheduled the PUSCH 3 for the UE 4, and determines a position of a time-frequency resource of the PUSCH 3. The moment t4 herein is equivalent to the fourth PDCCH occasion shown in FIG. 7.

It should be noted that, in FIG. 7, the moment t1 is earlier than the moment t2, the moment t2 is earlier than the moment t3, and the moment t3 is earlier than the moment t4.

S630: The base station sends the GC-DCI to the UE.

For example, the base station sends the GC-DCI to the UE 1 to the UE 4 in a multicast manner.

When scheduling transmission of the PUSCH 2 (a URLLC PUSCH) for the UE 1, the base station sends the UL PI in a multicast manner, where the UL PI is carried in the GC-DCI. As shown in FIG. 7, the base station sends DCI 4 at the moment t3, where the DCI 4 is GC-DCI, includes a UL PI (namely, indication information of a preempted resource), and is scrambled by using a configured UL PI-RNTI.

The DCI 4 indicates a preempted time-frequency resource, namely, a first time-frequency resource. Optionally, the first time-frequency resource is located in a preset reference time-frequency resource region. Optionally, the reference time-frequency resource region is predefined or is configured by using a higher layer parameter.

For example, first DCI includes two bitmaps: a first bitmap and a second bitmap. The first bitmap includes [a1, a2, . . . , aM], a length M of the first bitmap corresponds to a quantity of segments of the reference time-frequency resource region in time domain, a value of each bit ai of the first bitmap corresponds to whether an $i^{th}$ segment of the reference time-frequency resource region in time domain is preempted, and the time domain segment is counted in chronological order, where i and M are integers, and $1 \leq i \leq M$. The second bitmap includes [b1, b2, . . . , bN], a length N of the second bitmap corresponds to a quantity of segments of the reference time-frequency resource region in frequency domain, a value of each bit bj of the second bitmap corresponds to whether a $j^{th}$ segment of the reference time-frequency resource region in frequency domain is preempted, and the frequency domain segment is counted in ascending order of frequencies, where j and N are integers, and $1 \leq j \leq N$.

Optionally, when the value of ai in the first bitmap and the value of bj in the second bitmap are both 1, a corresponding time-frequency sub-resource is preempted, where the time-frequency sub-resource corresponds to the $i^{th}$ segment in time domain, and corresponds to the $j^{th}$ segment in frequency domain.

Optionally, the quantity M of time domain segments time domain segment M may be 1.

Correspondingly, after receiving the DCI 4, the UE 1 to the UE 4 each may determine a preempted time domain resource (preempted resource), namely, the first time-frequency resource.

S640: When uplink transmission overlaps a preempted time domain resource, the UE determines, depending on whether the uplink transmission meets a first condition, whether to perform uplink transmission on an overlapping resource.

The first condition is that described in the method 400 in FIG. 4, and details are not described herein again.

Optionally, when time-frequency resources of uplink transmission overlap the preempted time domain resource, the UE 1 to the UE 4 may determine, based on a sending moment of the DCI 4 and sending moments of the DCI for scheduling the uplink transmission of the UE 1 to the UE 4, whether to perform uplink transmission on overlapping resources.

For example, the UE 2 finds that the PUSCH 1 of the UE 2 overlaps the preempted time domain resource, and the scheduling moment t1 of the PUSCH 1 is earlier than the receiving moment t3 of the UL PI. Therefore, the UE 2 does not send or stops sending the PUSCH 1.

Optionally, the UE 2 does not send or stops sending information on an overlapping time domain symbol or time-frequency resource between the PUSCH 1 and the preempted time domain resource.

For another example, the UE 3 finds that the PUCCH 1 of the UE 3 overlaps the preempted time domain resource, and the scheduling moment t2 of the PUCCH 1 is earlier than the receiving moment t3 of the UL PI. Therefore, the UE 3 does not send or stops sending the PUCCH 1.

Optionally, the UE 3 does not send or stops sending information on an overlapping time domain symbol or time-frequency resource between the PUCCH 1 and the preempted time domain resource.

For another example, the UE 1 finds that the PUSCH 2 of the UE 1 overlaps the preempted time domain resource, but the scheduling moment t3 of the PUSCH 2 is the same as the receiving moment t3 of the UL PI. Therefore, the UE 1 ignores impact of the UL PI on the PUSCH 2, and normally sends the PUSCH 2.

For another example, the UE 4 finds that the PUSCH 3 of the UE 4 overlaps the preempted time domain resource, but the scheduling moment t4 of the PUSCH 3 is later than the receiving moment t3 of the UL PI. Therefore, the UE 4 ignores impact of the UL PI on the PUSCH 3, and normally sends the PUSCH 3.

S650: The base station determines, based on a time sequence of sending the scheduling information and the GC-DCI, whether to receive the corresponding uplink transmission.

Optionally, the base station determines, based on a time sequence in which the base station sends the DCI 1 to the DCI 5, whether to receive the corresponding uplink transmission. Using the DCI 1 and the PUSCH 1 as an example, the base station determines, based on a time sequence in which the base station sends the DCI 1 and the DCI 4, whether to receive the PUSCH 1 scheduled by using the DCI 1 and sent by the UE 2, or determines whether to receive the PUSCH 2 on the overlapping time domain symbol or time-frequency resource between the PUSCH 1 and the preempted resource indicated by the DCI 4. A determining process corresponds to the UE 1 to UE 4 determining whether to perform uplink transmission on the overlapping time-frequency resources in S640. Details are not described herein again.

A case in another possible embodiment of this application is similar to that in the embodiment in FIG. 7. In the another possible embodiment, as shown in FIG. 8, a base station does not send DCI 2 and DCI 5 at moments t2 and t4, and does not schedule uplink transmission for a UE 3 and a UE 4.

The UE 3 in FIG. 8 is configured to send a grant-free (GF) PUSCH, and the GF PUSCH overlaps a preempted resource indicated by a UL PI. The UE 4 is configured to send CSI (or an SR), and a PUCCH resource carrying the CSI (or the SR) overlaps the preempted resource indicated by the UL PI.

In this case, after receiving the UL PI, the UE 3 finds that the GF PUSCH of the UE 3 overlaps a time-frequency resource indicated by the PI, and the GF PUSCH to be sent by the UE 3 is configured rather than scheduled. Therefore, the UE 3 does not send the GF PUSCH, in other words, the UE 3 does not send the GF PUSCH on an overlapping time domain symbol or time-frequency resource.

Similarly, after receiving the UL PI, the UE 4 finds that the PUCCH of the UE 4 overlaps a time-frequency resource indicated by the PI, and the PUCCH to be sent by the UE 4 is configured rather than scheduled. Therefore, the UE 4 does not send the PUCCH, in other words, the UE 4 does not send the PUCCH on an overlapping time domain symbol or time-frequency resource.

According to the method in FIG. 6, the first condition is that the uplink transmission is scheduled by using second DCI and a sending moment of the first DCI is not later than a sending moment of the second DCI, and the UE may determine, based on the first condition, whether to transmit uplink information on a second time-frequency resource. Therefore, according to the method provided in this application, more appropriate transmission can be implemented during uplink transmission, to ensure that uplink transmission of a URLLC user does not preempt a resource of previous uplink transmission of the URLLC user or a resource of subsequently scheduled higher-priority URLLC transmission.

Figure 9:
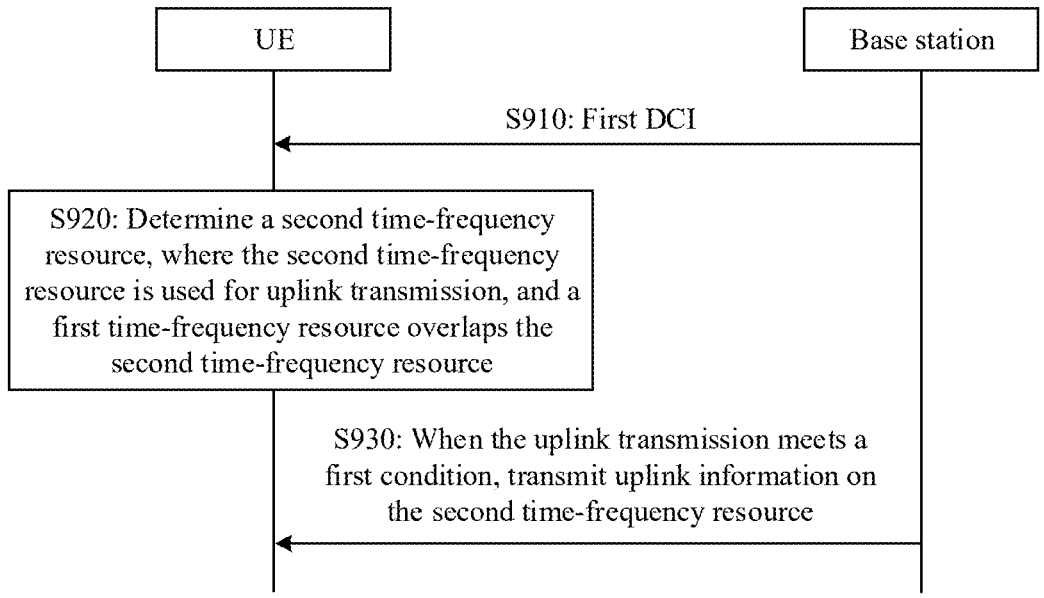
FIG. 9 is a flowchart of a communication method according to another embodiment of this application.

The following describes Case 2 in the method 400 in FIG. 4 in detail with reference to FIG. 9.

FIG. 9 is a flowchart of a communication method 900 according to an embodiment of this application.

S910: A base station sends first DCI to a UE.

The first DCI indicates a first time-frequency resource, and the first time-frequency resource is a preempted time-frequency resource.

Optionally, the first DCI is multicasting downlink control information GC-DCI, and the GC-DCI is used to carry a UL PI.

S920: The UE determines a second time-frequency resource.

The second time-frequency resource is used for uplink transmission, and the first time-frequency resource overlaps the second time-frequency resource.

Optionally, the uplink transmission may be dynamically scheduled, or the uplink transmission may be configured transmission.

S930: When the uplink transmission meets a first condition, the UE transmits uplink information to the base station on the second time-frequency resource. When the uplink transmission does not meet the first condition, the UE does not transmit the uplink information to the base station on the second time-frequency resource, or the UE does not transmit the uplink information to the base station on an overlapping time-frequency resource or time domain resource between the second time-frequency resource and the first time-frequency resource.

Optionally, based on a type of the uplink transmission, the first condition may include at least one of the following cases:

(1) The uplink transmission is dynamic grant uplink transmission, namely, a dynamic PUSCH.

Optionally, the dynamic PUSCH is activated by using third DCI. The first condition includes at least one of the following:

A value of a first bit field in the third DCI is a first set. The first set is predefined or is configured by using a higher layer parameter. Optionally, the first bit field may be one bit. For example, the value of the first bit field is 0.

The third DCI is in a first format, where the first format is a DCI format that is configured by a higher layer and that corresponds to a smallest DCI payload size in a plurality of DCI formats for scheduling data transmission. The first format is predefined or is configured by using a higher layer parameter. For example, the first format is a DCI format for scheduling uplink data transmission, and is neither a DCI format 0_0 nor a DCI format 0_1 in NR. Optionally, a quantity of DCI bits in the first format is less than a quantity of DCI bits in the DCI format 0_0 or the DCI format 0_1. Optionally, the first format is indicated by a second bit field in the third DCI, and the first format is used to schedule URLLC data transmission.

An RNTI corresponding to the third DCI is a first RNTI. Optionally, the first RNTI may be a modulation and coding scheme-cell radio network temporary identifier (MCS-C-RNTI), a configured scheduling radio network temporary identifier (CS-RNTI), or the like.

A number of a search space in which the third DCI is located belongs to a second set. The second set is predefined or is configured by using a higher layer parameter.

A number of a control resource set in which the third DCI is located belongs to a third set. The third set is predefined or is configured by using a higher layer parameter.

An identifier or a priority of a logical channel corresponding to the dynamic PUSCH belongs to a preset set, or an identifier of a logical channel corresponding to the dynamic PUSCH is less than or equal to a preset threshold, or a priority of a logical channel corresponding to the dynamic PUSCH is greater than or equal to a third threshold.

(2) The uplink transmission is Type-1 configured grant uplink transmission, namely, a Type-1 configured PUSCH.

Optionally, the first condition includes at least one of the following:

A configuration identifier of the Type-1 configured PUSCH belongs to a fourth set. The fourth set is predefined or is configured by using a higher layer parameter. Alternatively, a higher layer configuration parameter of the Type-1 configured PUSCH includes a priority indication parameter, and the first condition is that a value of the priority indication parameter is a preset value, for example, 0.

An MCS table of the Type-1 configured PUSCH is a low-spectral-efficiency table, that is, spectral efficiency corresponding to a lowest MCS index in the table is the lowest among all tables.

A transmission periodicity of the Type-1 configured PUSCH is less than or equal to a first threshold. The first threshold is predefined or is configured by using a higher layer parameter. For example, the first threshold may be 2 or 7.

A transmission length of the Type-1 configured PUSCH is less than or equal to a second threshold. The second threshold is predefined or is configured by using a higher layer parameter. For example, the second threshold may be 2, 4, or 7.

An identifier or a priority of a logical channel corresponding to the Type-1 configured PUSCH belongs to a preset set, or an identifier of a logical channel corresponding to the Type-1 configured PUSCH is less than or equal to a preset threshold, or a priority of a logical channel corresponding to the Type-1 configured PUSCH is greater than or equal to a third threshold.

Optionally, the Type-1 configured PUSCH may be always used as URLLC transmission. In this case, the UL PI can never be used to preempt the Type-1 configured PUSCH. That is, the first condition is that the uplink transmission is the Type-1 configured PUSCH.

(3) The uplink transmission is Type-2 configured grant uplink transmission, namely, a Type-2 configured PUSCH.

The Type-2 configured PUSCH is activated by using third DCI.

Optionally, for the first condition, refer to that for the dynamic PUSCH, or refer to that for the Type-1 configured PUSCH.

Alternatively, for a first condition for the first transmission of the Type-2 configured PUSCH, refer to that for the dynamic PUSCH. For a first condition for non-first transmission of the Type-2 configured PUSCH, refer to that for the Type-1 configured PUSCH.

(4) The uplink transmission is HARQ-ACK transmission corresponding to a dynamically scheduled PDSCH, and the PDSCH is scheduled by using third DCI. For the first condition, refer to that for the dynamic PUSCH.

Optionally, a third bit field in the third DCI may indicate codebook information in which feedback information of a downlink data channel is located, and the first condition is that a value of the codebook information is a preset value, for example, 0. The codebook information may be a codebook type or a codebook number.

(5) The uplink transmission is HARQ-ACK transmission corresponding to a semi-persistent scheduling PDSCH.

The PDSCH is activated by using third DCI. For the first condition, refer to that for the HARQ-ACK transmission corresponding to the dynamically scheduled PDSCH.

Alternatively, the first condition may include at least one of the following:
a configuration identifier of the SPS PDSCH belongs to a fourth set;
an MCS table of the SPS PDSCH is a low-spectral-efficiency table, that is, spectral efficiency corresponding to a lowest MCS index in the table is the lowest among all tables;
a transmission periodicity of the SPS PDSCH is less than or equal to a first threshold, where the first threshold is predefined or is configured by using a higher layer parameter, and for example, may be 2 or 7; or
a transmission length of the SPS PDSCH is less than or equal to a second threshold, where the second threshold is predefined or is configured by using a higher layer parameter, and for example, may be 2, 4, or 7.

(6) The uplink transmission is P-CSI or SP-CSI.

In this case, the uplink transmission may be carried on a PUCCH or a PUSCH.

Optionally, the first condition may include at least one of the following:
a configuration identifier of the CSI report belongs to a fourth set;
a channel quality indicator (CQI) table in a CSI report configuration is a low-spectral-efficiency table;
a value of a transmission periodicity of the CSI report is less than or equal to a first threshold; or
a time domain length of the PUCCH carrying the CSI report is less than or equal to a second threshold.

Alternatively, the P-CSI/SP-CSI may be always considered as eMBB transmission. In this case, the UL PI may be used to preempt the P-CSI or the SP-CSI, that is, the first condition includes that the uplink transmission is not the P-CSI or the SP-CSI.

(7) The uplink transmission is A-CSI.

In this case, the A-CSI is triggered by using third DCI.

Optionally, for the first condition, refer to that for the dynamic PUSCH, or refer to that for the P-CSI or the SP-CSI.

(8) The uplink transmission is an SR.

In this case, the uplink transmission is carried on a PUCCH.

Optionally, the first condition may include at least one of the following:
an ID of an SR configuration corresponding to the SR belongs to a fourth set, where the fourth set is predefined or is configured by using a higher layer parameter;
a transmission periodicity of an SR configuration corresponding to the SR is less than or equal to a first threshold, where the first threshold is predefined or is configured by using a higher layer parameter, and for example, may be 2 or 7;
a time domain length of the PUCCH carrying the SR is less than or equal to a second threshold, where the second threshold is predefined or is configured by using a higher layer parameter, and for example, may be 2, 4, or 7; or
an identifier or a priority of a logical channel associated with an SR configuration corresponding to the SR belongs to a preset set, or the identifier of the logical channel is less than or equal to a preset threshold, or the priority of the logical channel is greater than or equal to a third threshold, where a logical channel associated with the scheduling request is a logical channel associated with the logical channel identifier, and a scheduling request corresponding to the identifier is triggered after data arrives on these logical channels.

(9) The uplink transmission is a configured SRS.

Optionally, the first condition may include at least one of the following:
an ID of an SRS configuration belongs to a fourth set; or
a transmission periodicity of an SRS configuration is less than or equal to a first threshold.

Alternatively, the configured SRS may be always considered as eMBB transmission. In this case, the UL PI may be used to preempt the configured SRS, that is, the first condition includes that the uplink transmission is not the configured SRS.

(10) The uplink transmission is a dynamically triggered SRS.

In this case, the uplink transmission is triggered by using third DCI.

Optionally, for the first condition, refer to that for the configured SRS, or refer to that for the dynamic PUSCH.

(11) The uplink transmission is a PRACH.

Optionally, the first condition may include at least one of the following:
an ID of the PRACH belongs to a fourth set; or
a transmission periodicity of the PRACH is less than or equal to a first threshold.

Alternatively, the PRACH may be always considered as URLLC transmission. In this case, the UL PI can never be used to preempt the PRACH, that is, the first condition is that the uplink transmission is the PRACH.

According to the method in FIG. 9, it may be determined that the uplink transmission that meets the first condition is URLLC transmission. In this case, the UE transmits the uplink information on the second time-frequency resource, to prevent a transmission resource of a URLLC service from being preempted by using a UL PI, so that reliability of resource preemption by the URLLC service during uplink transmission can be improved.

Similarly, in this application, when downlink transmission is URLLC transmission, the UE may alternatively transmit downlink information on a second time-frequency resource used for downlink transmission. For a method, refer to the method 900 in FIG. 9. Details are not described herein again.

Figure 10:
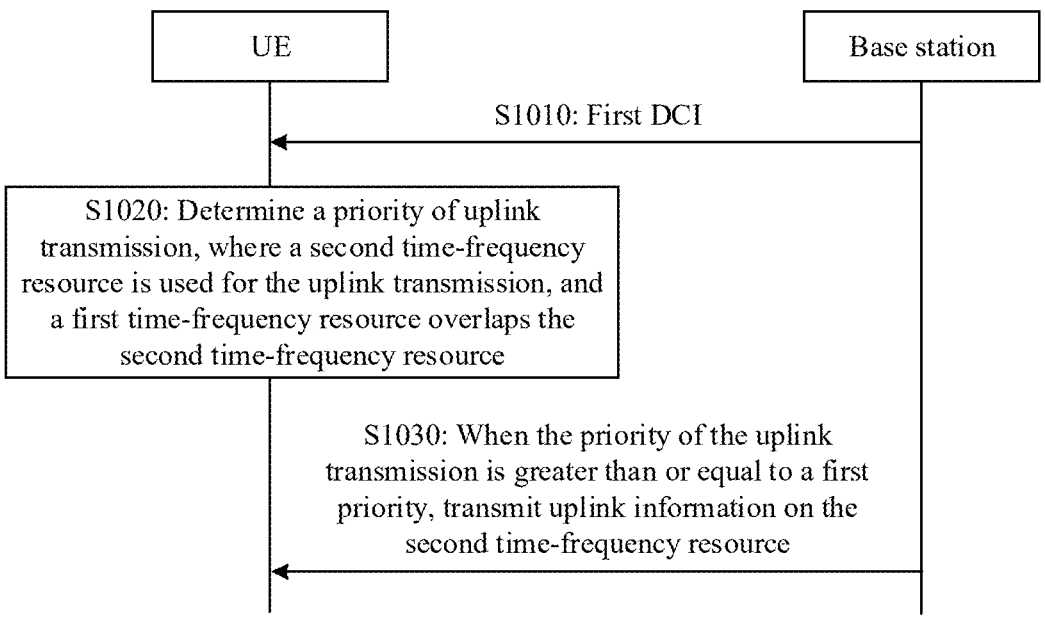
FIG. 10 is a flowchart of a communication method according to another embodiment of this application.

The following describes Case 3 in the method 400 in FIG. 4 in detail with reference to FIG. 10.

FIG. 10 is a flowchart of a communication method 1000 according to an embodiment of this application.

S1010: A base station sends first DCI to a UE.

The first DCI is used to indicate a first time-frequency resource and a value of a first priority.

Optionally, the first DCI is multicasting downlink control information GC-DCI, and the GC-DCI is used to carry a UL PI.

Optionally, the first DCI may include first indication information, where the first indication information is used to indicate the first priority.

For example, a width of the first indication information is one bit, and a value of the first indication information may be 0 or 1, respectively indicating that the value of the first priority is 0 or 1. Alternatively, a value of the first indication information may be 1 or 2.

For another example, a width of the first indication information is three bits, and a value of the first indication information may be 000 to 111, respectively indicating that the value of the first priority is 0 to 7. Alternatively, a value of the first indication information may be 1 to 8.

Optionally, the first DCI includes second indication information, and the second indication information indicates the first time-frequency resource. An indication method may be the same as the method 900 in FIG. 9.

S1020: The UE determines a priority of uplink transmission.

S1030: When the priority of the uplink transmission is greater than or equal to the first priority, the UE transmits uplink information to the base station on a second time-frequency resource.

Optionally, when a time-frequency resource occupied by the uplink transmission overlaps the first time-frequency resource, the UE compares a value of the priority of the uplink transmission with the value of the first priority. When the priority of the uplink transmission is greater than or equal to the first priority, the UE normally sends the uplink transmission. When the priority of the uplink transmission is less than the first priority, the UE does not send or stops sending the uplink transmission. That is, the UE stops sending information on an overlapping time domain symbol or time-frequency resource between the uplink transmission and the first time-frequency resource.

Optionally, based on a type of the uplink transmission, that the UE determines a priority of uplink transmission in S1020 may include at least one of the following cases.

(1) The uplink transmission is dynamic grant uplink transmission, namely, a dynamic PUSCH.

Optionally, the dynamic PUSCH is activated by using fourth DCI. The value of the priority of the uplink transmission may be determined based on one or more of a value in a first bit field in the fourth DCI, a format of the fourth DCI, an RNTI corresponding to the fourth DCI, an identifier (ID) of a search space in which the fourth DCI is located, or an ID of a control resource set in which the fourth DCI is located.

For example, the first bit field may include one bit, or may include a plurality of bits. Optionally, if the first bit field in the fourth DCI includes one bit, values 0 and 1 of the bit may respectively indicate that the priority of the uplink transmission is 0 and 1 (or 1 and 2). Alternatively, if the first bit field in the fourth DCI includes three bits, values 000 to 111 of the bits respectively indicate that a second priority is 0 to 7 (or 1 to 8).

For another example, if the format of the fourth DCI is a format 1, it indicates that the priority of the uplink transmission is 1; or if the format of the furth DCI is a format 2, it indicates that the priority of the uplink transmission is 2. The format 2 may be DCI formats 0_0 or 0_1 in NR, and the format 1 may be a DCI format that is different from the format 2 and that is used to schedule uplink data transmission. Optionally, a quantity of DCI bits in the format 1 is less than a quantity of DCI bits in the format 2.

For another example, if the RNTI corresponding to the fourth DCI is a first RNTI, it indicates that the priority of the uplink transmission is 1; or if the RNTI corresponding to the fourth DCI is a second RNTI, it indicates that the priority of the uplink transmission is 2. Descriptions of the first RNTI are the same as those in FIG. 9. A type of the second RNTI is different from that of the first RNTI, and the second RNTI may be, for example, a cell radio network temporary identifier (C-RNTI).

For another example, there is a correspondence between a set of the identifier of the search space in which the fourth DCI is located and the value of the priority of the uplink transmission. For example, if the identifier of the search space in which the fourth DCI is located belongs to a first set, the priority of the uplink transmission is 0. If the identifier of the search space in which the fourth DCI is located belongs to a second set, the priority of the uplink transmission is 1. The first set and the second set are configured by a higher layer or predefined in a protocol.

For another example, there is a correspondence between a set of the identifier of the control resource set in which the fourth DCI is located and the value of the priority of the uplink transmission. For example, if the identifier of the control resource set in which the fourth DCI is located belongs to a third set, the priority of the uplink transmission is 0. If the identifier of the control resource set in which the fourth DCI is located belongs to a fourth set, the priority of the uplink transmission is 1. The third set and the fourth set are configured by a higher layer or predefined in a protocol.

(2) The uplink transmission is Type-1 configured grant uplink transmission, namely, a Type-1 configured PUSCH.

A value of the priority of the uplink transmission may be determined by using a second higher layer parameter.

Optionally, the second higher layer parameter explicitly indicates the value of the priority of the configured grant uplink data transmission, in other words, the second higher layer parameter is a priority indication parameter.

Alternatively, the second higher layer parameter implicitly indicates the value of the priority of the configured grant uplink data transmission. For example, the second higher layer parameter may be one or more of the following information: a configuration identifier of the Type-1 configured PUSCH, an MCS table of the Type-1 configured PUSCH, a transmission periodicity of the Type-1 configured PUSCH, or a time domain length of the Type-1 configured PUSCH.

The second higher layer parameter may be the configuration identifier of the Type-1 configured PUSCH, different configuration identifiers are used to correspond to different transmission parameters, and there is a correspondence between the configuration identifier and the value of the priority. For example, if the configuration identifier belongs to a first set, a second priority is 1; or if the configuration identifier belongs to a second set, the second priority is 2. For another example, the second higher layer parameter may be the MCS table of the Type-1 configured PUSCH. When the MCS table is a low-spectral-efficiency table (that is, spectral efficiency corresponding to a lowest MCS index in the table is the lowest among all tables), a second priority is 1; or when the MCS table is not a low-spectral-efficiency table, the second priority is 2. For another example, when the transmission periodicity of the Type-1 configured PUSCH is less than or equal to a first threshold, a second priority is 1; or when the transmission periodicity of the Type-1 configured PUSCH is greater than the first threshold, the second priority is 2. The first threshold is predefined or is configured by a higher layer. For still another example, when the time domain length of the Type-1 configured PUSCH is less than or equal to a second threshold, a second priority is 1; or when the time domain length of the Type-1 configured PUSCH is greater than the second threshold, the first priority is 2. The second threshold is predefined or is configured by a higher layer.

(3) The uplink transmission is Type-2 configured grant uplink transmission, namely, a Type-2 configured PUSCH.

Optionally, the Type-2 configured PUSCH is activated by using fourth DCI. In this case, for the priority of the uplink transmission, refer to the determining method used for the dynamic PUSCH or the Type-1 configured PUSCH.

(4) The uplink transmission is HARQ-ACK transmission corresponding to a dynamically scheduled PDSCH.

Optionally, the PDSCH is scheduled by using fourth DCI, and a value of the priority of the uplink transmission may be determined based on one or more of a value in a second bit field in the fourth DCI, a format of the fourth DCI, an RNTI corresponding to the fourth DCI, an identifier (ID) of a search space in which the fourth DCI is located, or an ID of a control resource set in which the fourth DCI is located. A method for determining the priority of the uplink transmission based on the value in the second bit field in the fourth DCI, the format of the fourth DCI, the RNTI corresponding to the fourth DCI, the identifier (ID) of the search space in which the fourth DCI is located, or the ID of the control resource set in which the fourth DCI is located is similar to the method for determining the priority of the dynamic PUSCH in (1), and details are not described herein again.

(5) The uplink transmission is HARQ-ACK transmission corresponding to a semi-persistent scheduling PDSCH.

Optionally, the PDSCH is activated by using fourth DCI.

A value of the priority of the uplink transmission may be determined based on one or more of a value in a third bit field in the fourth DCI, a format of the fourth DCI, an RNTI corresponding to the fourth DCI, an identifier (ID) of a search space in which the fourth DCI is located, or an ID of a control resource set in which the fourth DCI is located.

Optionally, the value of the priority of the uplink transmission may be determined by using a second higher layer parameter. A determining method is the same as that used for the Type-1 configured PUSCH, and details are not described herein again.

(6) The uplink transmission is P-CSI or SP-CSI.

A value of the priority of the second uplink transmission may be determined by using a second higher layer parameter. Optionally, the second higher layer parameter is included in CSI report configuration information, and explicitly indicates a value of a priority of the CSI report. In other words, the second higher layer parameter is a priority indication parameter. Optionally, the second higher layer parameter is included in CSI report configuration information, and implicitly indicates a value of a priority of the CSI report. For example, the second higher layer parameter may be one or more of the following information: an identifier of the CSI report configuration, a transmission periodicity of the CSI report, a time domain length of a PUCCH corresponding to the CSI report, or a CQI table in the CSI report configuration.

For example, there is an association relationship between the identifier of the CSI report configuration and the priority of the CSI. For example, a priority of one piece of CSI may correspond to an ID set of one CSI report configuration, so that a priority of CSI may be determined based on an ID of a CSI report configuration corresponding to the CSI. For example, when the priority of the CSI is 1, a corresponding ID set of the CSI report configuration is {1, 2, 3}, in other words, an ID set of a CSI report configuration corresponding to CSI whose priority is 1 is {1, 2, 3}. In this case, if an ID of a CSI report configuration corresponding to CSI is 3, it may be determined that a priority of the CSI is 1.

Alternatively, there may be an association relationship between the CQI table in the CSI report configuration and the priority of the CSI, so that a priority of CSI may be determined based on a CQI table in a CSI report configuration corresponding to the CSI. For example, a priority of one piece of CSI may correspond to a CQI table set in one CSI report configuration. For example, when a CQI table set in the CSI report configuration is {Table 1}, a corresponding priority of the CSI is 1; or when a CQI table set in the CSI report configuration is {Table 2, Table 3}, a corresponding priority of the CSI is 2. Optionally, spectral efficiency of a lowest index element in Table 1 is less than spectral efficiency of lowest index elements in Table 2 and Table 3. In other words, if a CQI table set corresponding to CSI whose priority is 1 is {Table 1}, it may be determined that a priority of CSI is 1 if a CQI table that is in a CSI report configuration and that corresponds to the CSI is Table 1.

Alternatively, there is a preset correspondence between a value of the periodicity of the CSI report and a value of the priority of the CSI, or there is a preset correspondence between the time domain length of the PUCCH carrying the CSI report and a value of the priority of the CSI.

(7) The uplink transmission is A-CSI.

Optionally, the A-CSI is triggered by using fourth DCI. For a determining method, refer to that used for the dynamic PUSCH, or refer to that used for the P-CSI or the SP-CSI. Details are not described herein again.

(8) The uplink transmission is an SR.

A value of the priority of the second uplink transmission may be determined by using a second higher layer parameter. Optionally, the second higher layer parameter is included in SR configuration information, and explicitly indicates a value of a priority of the SR configuration. In other words, the second higher layer parameter is a priority indication parameter. Optionally, the second higher layer parameter is included in SR configuration information, and implicitly indicates a value of a priority of the SR configuration. The second higher layer parameter may be one or more of the following information: an identifier of the SR configuration, a periodicity of the SR configuration, a time domain length of a PUCCH corresponding to the SR configuration, or an ID or a priority of a logical channel corresponding to the SR configuration.

For example, there is an association relationship between the ID of the SR configuration and the priority of the SR configuration, or there is an association relationship between the periodicity of the SR configuration and the priority of the SR configuration, or there is an association relationship between the time domain length of the PUCCH carrying the SR configuration and the priority of the SR configuration.

For another example, there is a preset correspondence between an ID set of the logical channel corresponding to the SR and the value of the priority of the SR configuration, or there is a preset correspondence between a value of the priority of the logical channel corresponding to the SR and the value of the priority of the SR configuration.

(9) The uplink transmission is a configured SRS.

A value of the priority of the second uplink transmission may be determined by using a second higher layer parameter. Optionally, the second higher layer parameter is included in SRS configuration information, and explicitly indicates a value of a priority of the SRS configuration. In other words, the second higher layer parameter is a priority indication parameter. Optionally, the second higher layer parameter is included in SRS configuration information, and implicitly indicates a value of a priority of the SRS configuration. For example, the second higher layer parameter may be one or more of the following information: an identifier of the SRS configuration or a periodicity of the SRS configuration. For example, there is an association relationship between the ID of the SRS configuration and the priority of the SRS configuration, or there is an association relationship between the periodicity of the SRS configuration and the priority of the SRS configuration.

(10) The uplink transmission is a dynamically scheduled SRS, and the SRS is SRS transmission triggered by using fourth DCI.

A value of the priority of the uplink transmission may be determined by using a second higher layer parameter, and a meaning of the second higher layer parameter is the same as that in (8). Optionally, the value of the priority of the uplink transmission may be determined based on a value of a fourth bit field in the fourth DCI, and the fourth bit field explicitly indicates the priority of the SRS.

According to the method in FIG. 10, when the priority of the uplink transmission is greater than or equal to the first priority, the UE transmits the uplink information on the second time-frequency resource, to prevent a lower-priority URLLC service from preempting a transmission resource of a higher-priority URLLC service, so that reliability of resource preemption by a URLLC service during uplink transmission can be improved.

In another possible embodiment of this application, for a dynamic PUSCH, a Type-1 configured PUSCH, a Type-2 configured PUSCH, a HARQ-ACK corresponding to a dynamic PDSCH, a HARQ-ACK corresponding to an SPS PDSCH, and an SR, namely, (1) to (6) in S920, the UE determines a value of a priority of the uplink transmission, and determines, based on values of the priority and a first priority, whether to send uplink information on an overlapping time domain symbol or time-frequency resource. For CSI, a configured SRS, and a dynamically scheduled SRS, the UE directly does not send uplink information on an overlapping time domain symbol or time-frequency resource.

The UE may always consider the CSI, the configured SRS, and the dynamically scheduled SRS as eMBB transmission. In this case, the UE directly does not send the uplink information on the overlapping time domain symbol or time-frequency resource.

Similarly, in this application, when a priority of downlink transmission is greater than or equal to the first priority, the UE may alternatively transmit downlink information on a second time-frequency resource used for downlink transmission. For a method, refer to the method 1000 in FIG. 10. Details are not described herein again.

Figure 11:
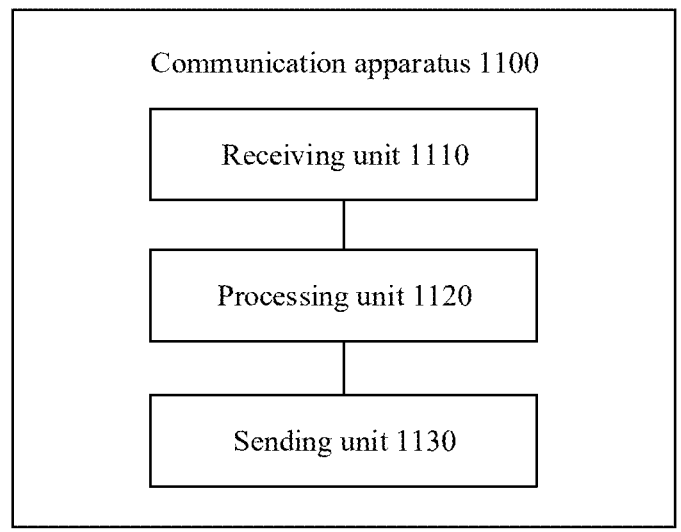
FIG. 11 is a diagram of a structure of a communication apparatus according to an embodiment of this application.

FIG. 11 is a block diagram of a communication apparatus 1100 according to an embodiment of this application. As shown in FIG. 11, the communication apparatus 1100 may include a receiving unit 1110 and a sending unit 1130.

In a possible design, the communication apparatus 1100 may correspond to the terminal device (UE) in the foregoing method embodiments, for example, may be a terminal device, or may be a chip disposed in the terminal device. The communication apparatus 1100 can perform the steps performed by the terminal device in FIG. 4 to FIG. 6, FIG. 9, and FIG. 10.

For example, the receiving unit 1110 is configured to receive first downlink control information DCI, where the first DCI is used to indicate a first time-frequency resource.

A processing unit 1120 is configured to determine a second time-frequency resource, where the second time-frequency resource is used for uplink transmission, and the first time-frequency resource overlaps the second time-frequency resource.

The sending unit 1130 is configured to transmit uplink information on the second time-frequency resource when the uplink transmission meets a first condition.

Optionally, the sending unit 1130 is further configured to: when the uplink transmission does not meet the first condition, skip transmitting the uplink information on an overlapping time-frequency resource between the second time-frequency resource and the first time-frequency resource.

Optionally, the uplink transmission is scheduled by using second DCI, and the first condition is that a sending moment of the first DCI is not later than a sending moment of the second DCI.

Optionally, the uplink transmission is a dynamically scheduled uplink data channel, and the second DCI is used to schedule the uplink data channel; the uplink transmission is a dynamically scheduled uplink control channel, and the second DCI is used to schedule the uplink control channel; the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

Optionally, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

Optionally, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

Optionally, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

Optionally, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

Optionally, the first DCI is multicasting downlink control information GC-DCI.

For descriptions of functions performed by the communication apparatus 1100, refer to operations performed by the UE in some method embodiments of this application, for example, refer to the descriptions in the embodiments in FIG. 4 to FIG. 6, FIG. 9, and FIG. 10. Details are not described again.

Figure 12:
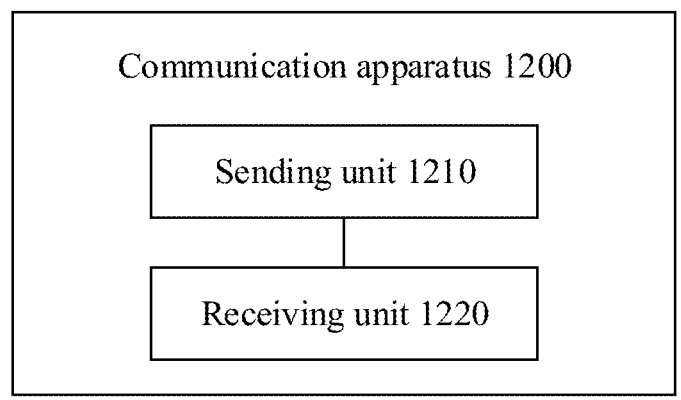
FIG. 12 is another diagram of a structure of a communication apparatus according to an embodiment of this application.

FIG. 12 is a block diagram of a communication apparatus 1200 according to an embodiment of this application. As shown in FIG. 12, the communication apparatus 1200 may include a receiving unit 1220 and a sending unit 1210.

In a possible design, the communication apparatus 1200 may correspond to the network device (base station) in the foregoing method embodiments, for example, may be a network device, or may be a chip disposed in the network device. The communication apparatus 700 can perform the steps performed by the network device in FIG. 4 to FIG. 6, FIG. 9, and FIG. 10.

For example, the sending unit 1210 is configured to send first downlink control information DCI, where the first DCI is used to indicate a first time-frequency resource.

The receiving unit 1220 is configured to receive uplink information on a second time-frequency resource when uplink transmission meets a first condition, where the second time-frequency resource is used for the uplink transmission, the uplink information is carried on the second time domain resource, and the first time-frequency resource overlaps the second time-frequency resource.

Optionally, the receiving unit 1220 is further configured to: when the uplink transmission does not meet the first condition, skip receiving the uplink information on an overlapping time-frequency resource between the second time-frequency resource and the first time-frequency resource.

Optionally, the uplink transmission is scheduled by using second DCI, and the first condition is that a sending moment of the first DCI is not later than a sending moment of the second DCI.

Optionally, the uplink transmission is a dynamically scheduled uplink data channel, and the second DCI is used to schedule the uplink data channel; the uplink transmission is a dynamically scheduled uplink control channel, and the second DCI is used to schedule the uplink control channel;

the uplink transmission is a dynamically scheduled uplink sounding reference signal, and the second DCI is used to schedule the uplink sounding reference signal; or the uplink transmission is a configured grant uplink data channel, and the second DCI is used to activate the configured grant uplink data channel.

Optionally, when the uplink transmission is scheduled by using third DCI, the uplink transmission includes at least one of a dynamically scheduled uplink data channel, a dynamically scheduled uplink control channel, a dynamically scheduled uplink sounding reference signal, or feedback information of a dynamically activated downlink data channel. The first condition includes at least one of the following: a value of a first bit field in the third DCI belongs to a first set, where the first bit field is used to indicate a value of a priority of the uplink transmission; the third DCI is in a first format, where the first format is a DCI format that is configured by a higher layer and that corresponds to a smallest DCI payload size in a plurality of DCI formats for scheduling data transmission; a value of a radio network temporary identifier RNTI of the third DCI is a first RNTI, where the first RNTI is a modulation and coding scheme-cell radio network temporary identifier MCS-C-RNTI; an identifier of a search space in which the third DCI is located belongs to a second set; or an identifier of a control resource set in which the third DCI is located belongs to a third set. The first set, the second set, the third set, the first format, and the first RNTI are predefined or are configured by using a higher layer parameter.

Optionally, when the uplink transmission is configured by using a first higher layer parameter, the uplink transmission includes at least one of a configured grant uplink data channel, feedback information of a semi-persistent scheduling downlink data channel, a scheduling request, or a configured uplink sounding reference signal. The first higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition includes at least one of the following: a configuration identifier in the first higher layer parameter belongs to a fourth set; a transmission periodicity in the first higher layer parameter is less than or equal to a first threshold; or a transmission length in the first higher layer parameter is less than or equal to a second threshold. The fourth set, the first threshold, and the second threshold are predefined or are configured by using a higher layer parameter.

Optionally, the uplink transmission is scheduled by using fourth DCI, and the uplink transmission includes at least one of a dynamically scheduled uplink data channel, a dynamically activated uplink data channel, a dynamically scheduled uplink control channel, feedback information of a dynamically activated downlink data channel, or a dynamically scheduled uplink sounding reference signal. The first condition is that a priority of the uplink transmission is greater than or equal to a first priority, the first priority is indicated by the first DCI, and the priority of the uplink transmission is indicated by the fourth DCI.

Optionally, the uplink transmission is configured by using a second higher layer parameter; the uplink transmission includes at least one of a configured grant uplink data channel, feedback information of a semi-persistent scheduling downlink data channel, a scheduling request, or a configured uplink sounding reference signal; and the second higher layer parameter is a configuration parameter of the configured grant uplink data channel, a configuration parameter of the semi-persistent scheduling downlink data channel, a configuration parameter of the scheduling request, or a configuration parameter of the configured uplink sounding reference signal. The first condition is that a priority of the uplink transmission is greater than or equal to a first priority, the first priority is indicated by the first DCI, and the priority of the uplink transmission is determined by using at least one of the following information: a configuration identifier in the second higher layer parameter, a transmission periodicity in the second higher layer parameter, or a transmission length in the second higher layer parameter.

Optionally, the first DCI is multicasting downlink control information GC-DCI.

For descriptions of functions performed by the communication apparatus 1200, refer to operations performed by the base station in some method embodiments of this application, for example, refer to the descriptions in the embodiments in FIG. 4 to FIG. 6, FIG. 9, and FIG. 10. Details are not described again.

Figure 13:
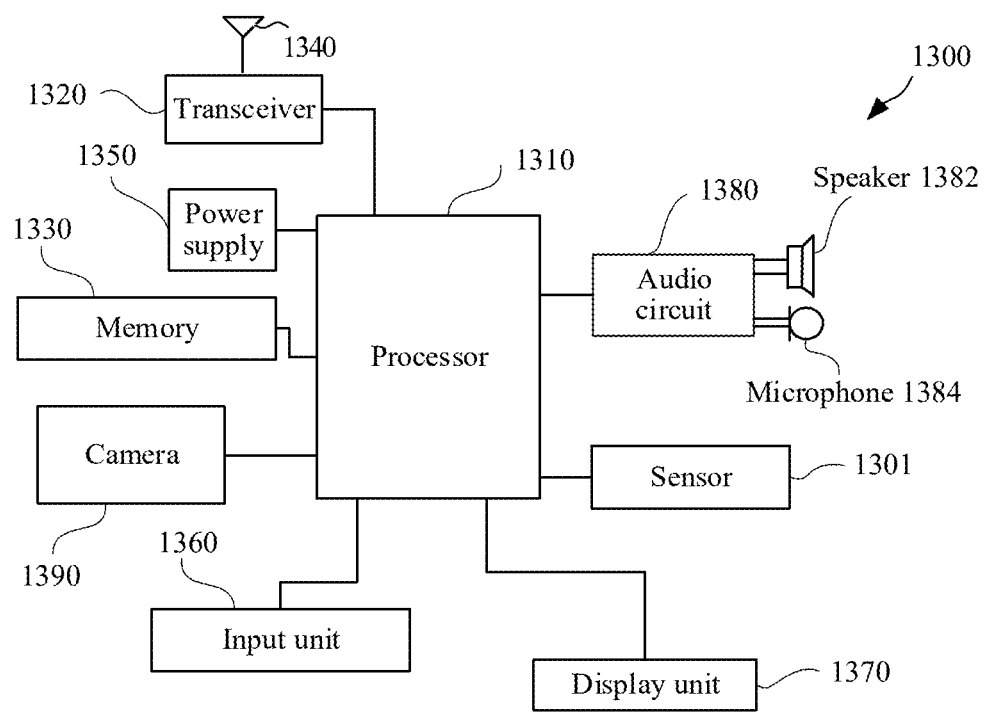
FIG. 13 is still another diagram of a structure of a communication apparatus according to an embodiment of this application.

FIG. 13 is a diagram of a structure of a communication apparatus 1300 according to an embodiment of this application. For example, the communication apparatus 1300 may be a terminal device, is used in the system shown in FIG. 1, and performs the functions of the terminal device (UE) in the foregoing method embodiments. Alternatively, the communication apparatus may be a chip in the terminal device, a vehicle-mounted communication terminal, an in-vehicle communication chip, or the like.

As shown in FIG. 13, the terminal device 1300 includes a processor 1310 and a transceiver 1320. Optionally, the terminal device 1300 may further include a memory 1330. The processor 1310, the transceiver 1320, and the memory 1330 may communicate with each other through an internal connection path, to transfer a control signal and/or a data signal. The memory 1330 is configured to store a computer program. The processor 1310 is configured to invoke the computer program from the memory 1330 and run the computer program, to control the transceiver 1320 to send and receive a signal. Optionally, the terminal device 1300 may further include an antenna 1340, configured to send, by using a radio signal, uplink data or uplink control signaling that is output by the transceiver 1320.

The processor 1310 and the memory 1330 may be integrated into one processing apparatus, and the processor 1310 is configured to execute program code stored in the memory 1330, to implement the foregoing functions. During some implementations, the memory 1330 may alternatively be integrated into the processor 1310, or may be independent of the processor 1310. The processor 1310 may correspond to a processing unit of the communication apparatus 1300.

The transceiver 1320 may correspond to the receiving unit 1110 and the sending unit 1130 in FIG. 11, and may also be referred to as a communication unit. The transceiver 1320 may include a receiver (or referred to as a receive circuit) and a transmitter (or referred to as a transmit circuit). Alternatively, the transceiver 1320 may include an input/output circuit. The receiver is configured to receive a signal, and the transmitter is configured to transmit a signal.

It should be understood that, the terminal device 1300 shown in FIG. 13 can implement the processes related to the terminal device in the method embodiments shown in FIG. 4 to FIG. 6, FIG. 9, and FIG. 10. The operations and/or functions of the modules in the terminal device 1300 are respectively intended to implement corresponding procedures in the foregoing method embodiments. For details, refer to the descriptions in the foregoing method embodiments. To avoid repetition, detailed descriptions are properly omitted herein.

The processor 1310 may be configured to perform an action that is implemented inside the terminal device and that is described in the foregoing method embodiments, and the transceiver 1320 may be configured to perform an action of receiving or sending that is performed by the terminal device from or to the network device and that is described in the foregoing method embodiments. For details, refer to the descriptions in the foregoing method embodiments. Details are not described herein again.

Optionally, the terminal device 1300 may further include a power supply 1350, configured to supply power to various components or circuits in the terminal device.

In addition, the terminal device 1300 may further include one or more of an input unit 1360, a display unit 1370, an audio circuit 1380, a camera 1390, a sensor 1301, and the like, to better improve functions of the terminal device. The audio circuit may further include a loudspeaker 1382, a microphone 1384, and the like.

Figure 14:
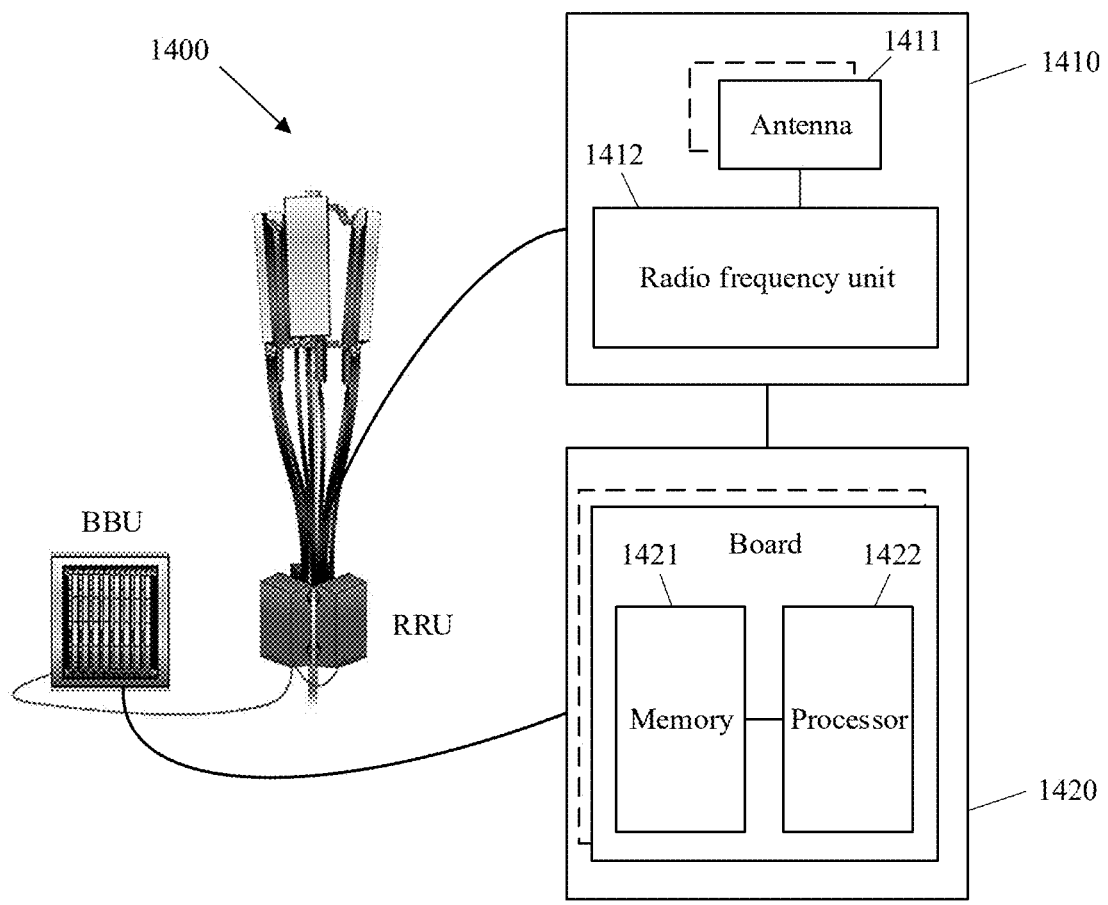
FIG. 14 is still another diagram of a structure of a communication apparatus according to an embodiment of this application.

FIG. 14 is a diagram of a structure of a communication apparatus 1400 according to an embodiment of this application, and for example, may be a diagram of a structure of a network device (base station). The network device 1400 may be used in the system shown in FIG. 1, to perform the functions of the base station in the foregoing method embodiments.

As shown in FIG. 14, for example, the network device 1400 may include one or more radio frequency units such as a remote radio unit (RRU) 1410 and one or more baseband units (BBUs) (which may also be referred to as digital units (DUs)) 1420. The RRU 1410 may be referred to as a communication unit or a transceiver unit, and corresponds to the sending unit 1210 and the receiving unit 1220 in FIG. 12. Optionally, the transceiver unit 1410 may also be referred to as a transceiver, a transceiver circuit, a transceiver, or the like, and may include at least one antenna 1411 and a radio frequency unit 1412.

Optionally, the transceiver unit 1410 may include a receiving unit and a sending unit. The receiving unit may correspond to a receiver (or referred to a receive circuit), and the sending unit may correspond to a transmitter (or referred to as a transmitter or a transmit circuit). For another example, the transceiver unit 1410 may be implemented by using a same module, for example, by using a transceiver circuit module. The RRU 1410 is mainly configured to send and receive a radio frequency signal, and perform conversion between the radio frequency signal and a baseband signal. For example, the RRU 1410 is configured to send first information to a terminal device. The BBU 1420 is mainly configured to perform baseband processing, control the network device, and so on. The RRU 1410 and the BBU 1420 may be physically disposed together; or may be physically disposed separately, in other words, in a distributed base station.

The BBU 1420 may be a control part of the network device, may be referred to as a processing unit, and is mainly configured to complete baseband processing functions such as channel coding, multiplexing, modulation, and spectrum spreading. For example, the BBU (the processing unit) may be configured to control the base station to perform an operation procedure related to the network device in the foregoing method embodiments, for example, send the foregoing configuration information.

In an example, the BBU 1420 may include one or more boards, and a plurality of boards may jointly support a radio access network (for example, an LTE network) of a single access standard, or may separately support radio access networks (for example, an LTE network, a 5G network, or another network) of different access standards. The BBU 1420 further includes a memory 1421 and a processor 1422. The memory 1421 is configured to store necessary instructions and data. The processor 1422 is configured to control the network device to perform necessary actions, for example, is configured to control the network device to perform an operation procedure related to the network device in the foregoing method embodiments. The memory 1421 and the processor 1422 may serve the one or more boards. In other words, a memory and a processor may be separately disposed on each board. Alternatively, a plurality of boards may share a same memory and a same processor. In addition, a necessary circuit may be further disposed on each board.

It should be understood that, the network device 1400 shown in FIG. 14 can implement the processes related to the base station in the method embodiments in FIG. 4 to FIG. 6, FIG. 9, and FIG. 10. The operations and/or the functions of the modules in the network device 1400 are respectively intended to implement corresponding procedures in the foregoing method embodiments. For details, refer to the descriptions in the foregoing method embodiments. To avoid repetition, detailed descriptions are properly omitted herein.

The BBU 1420 may be configured to perform an action that is implemented inside the base station and that is described in the foregoing method embodiments, and the RRU 1410 may be configured to perform an action of receiving or sending that is performed by the base station from or to the UE and that is described in the foregoing method embodiments. For details, refer to the descriptions in the foregoing method embodiments. Details are not described herein again.

An embodiment of this application further provides a processing apparatus, including a processor and an interface. The processor is configured to perform the method in any one of the foregoing method embodiments.

It should be understood that, the processor in this embodiment of this application may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general purpose processor may be a microprocessor, or the processor may be any conventional processor or the like.

It should be further understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (, RAM), and is used as an external cache. For example but not limitation, many forms of random access memories (RAMs) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware, firmware, or any other combination thereof. When the software is used to implement the embodiments, all or some of the foregoing embodiments may be implemented in a form of a computer program product. The computer program product includes one or more computer instructions or computer programs. When the computer instructions or the computer programs are loaded and executed on a computer, the procedures or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

As defined in the embodiments of this application, a one-way communication link from an access network to a terminal is a downlink, data transmitted on the downlink is downlink data, and a transmission direction of the downlink data is referred to as a downlink direction; a one-way communication link from the terminal to the access network is an uplink, data transmitted on the uplink is uplink data, and a transmission direction of the uplink data is referred to as an uplink direction.

The resource described in the embodiments of this application may also be referred to as a transmission resource, includes one or more of a time domain resource, a frequency domain resource, or a code channel resource, and may be used to carry data or signaling in an uplink communication process or a downlink communication process.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification indicates an "or" relationship between associated objects.

It should be understood that in the embodiments of the present disclosure, "B corresponding to A" indicates that B is associated with A, and B may be determined based on A. However, it should be further understood that determining B based on A does not mean that B is determined based on only A. B may alternatively be determined based on A and/or other information.

In the embodiments of this application, "a plurality of" means two or more than two.

Descriptions such as "first", "second" in the embodiments of this application are merely used for indicating and distinguishing between described objects, do not show a sequence, do not indicate a limitation on a quantity of devices in the embodiments of this application, and do not constitute any limitation on the embodiments of this application.

In the embodiments of this application, "connection" means various connection manners such as a direct connection or an indirect connection, for implementing communication between devices. This is not limited in the embodiments of this application.

Unless otherwise specified, "transmission" (transmit/transmission) in the embodiments of this application refers to bidirectional transmission, and includes a sending action and/or a receiving action. The word "transmission" in the embodiments of this application includes data sending, data receiving, or data sending and receiving. That is, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission.

A service in the embodiments of this application is a communication service obtained by a terminal from a network side, and includes a control plane service and/or a data plane service, for example, a voice service or a data traffic service. Sending or receiving of the service includes sending or receiving of service-related data or signaling.

In the embodiments of this application, a "network" and a "system" express a same concept, and a communication system is a communication network.

It should be understood that sequence numbers of the foregoing processes do not mean execution sequences in various embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that, the disclosed system, apparatus, and method may be implemented in another manner. For example, the described apparatus embodiments are merely examples. For example, division into the units is merely division into logical functions and may be other division during actual implementation. For example, a plurality of units or components may be combined or integrated into another system, or some features may be ignored or not performed. In addition, the displayed or discussed mutual couplings or direct couplings or communication connection may be implemented through some interfaces. The indirect coupling or communication connection between the apparatuses or units may be implemented in an electrical, a mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ReadROM), a random access memory (RAM), a magnetic disk, or an optical disc.

The foregoing descriptions are merely implementations of this application and are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving first downlink control information (DCI), the first DCI indicating a first uplink time-frequency resource, the first uplink time-frequency resource comprising a first group of time-frequency units, wherein a time-frequency unit of the first group of time-frequency units corresponds to a time domain start position and a time domain length in a time domain, and corresponds to a frequency domain start position and a frequency domain length in a frequency domain;
   determining a second uplink time-frequency resource for uplink transmission, the first uplink time-frequency resource overlaps the second uplink time-frequency resource in a time domain or overlaps in the time domain and in a frequency domain; and
   transmitting uplink information on the second uplink time-frequency resource when the uplink transmission meets a first condition, wherein the uplink transmission is scheduled using a second DCI, the uplink transmission is a dynamically scheduled uplink data channel and the second DCI is used to schedule the uplink data channel, or the uplink transmission is a dynamically scheduled uplink sounding reference signal and the second DCI is used to schedule the uplink sounding reference signal, the first condition is that a first DCI sending moment of the first DCI is not later than a second DCI sending moment of the second DCI, the first DCI is multicasting downlink control information comprising group-common downlink control information (GC-DCI).

2. The method according to claim 1, wherein the method further comprises:
   skipping transmitting the uplink information on an overlapping time-frequency resource between the second uplink time-frequency resource and the first uplink time-frequency resource when the uplink transmission does not meet the first condition.

3. The method according to claim 1, wherein the first uplink time-frequency resource is a preempted time-frequency resource.

4. The method according to claim 1, wherein:
   the first DCI sending moment is a first DCI first symbol of a downlink control channel carrying the first DCI; and
   the second DCI sending moment is a second DCI first symbol of a downlink control channel carrying the second DCI.

5. A network device, comprising:
   a memory storing instructions; and
   at least one processor in communication with the memory, the at least one processor configured, upon execution of the instructions, to perform the following steps:
   send first downlink control information (DCI) to a terminal, the first DCI indicating a first uplink time-frequency resource and indicating the terminal stop transmitting on the first uplink time-frequency resource, the first uplink time-frequency resource comprising a first group of time-frequency units, wherein a time-frequency unit of the first group of time-frequency units corresponds to a time domain start position and a time domain length in a time domain, and corresponds to a frequency domain start position and a frequency domain length in a frequency domain; and
   receive uplink information on a second uplink time-frequency resource from the terminal when an uplink transmission meets a first condition, the first uplink time-frequency resource overlaps the second uplink time-frequency resource in a time domain or overlaps in the time domain and in a frequency domain, wherein the uplink transmission is scheduled using a second DCI, the uplink transmission is a dynamically scheduled uplink data channel and the second DCI is used to schedule the uplink data channel, or the uplink transmission is a dynamically scheduled uplink sounding reference signal and the second DCI is used to schedule the uplink sounding reference signal, the first condition is that a first DCI sending moment of the first DCI is not later than a second DCI sending moment of the second DCI, the first DCI is multicasting downlink control information comprising group-common downlink control information (GC-DCI).

6. The network device according to claim 5, wherein the instructions, when executed by the at least one processor, further cause the network device to:
   skip receiving the uplink information on an overlapping time-frequency resource between the second uplink time-frequency resource and the first uplink time-frequency resource when the uplink transmission does not meet the first condition.

7. The network device according to claim 5, wherein the first uplink time-frequency resource is a preempted time-frequency resource.

8. The network device according to claim 5, wherein:
the first DCI sending moment is a first DCI first symbol of a downlink control channel carrying the first DCI; and
the second DCI sending moment is a second DCI first symbol of a downlink control channel carrying the second DCI.

9. A communication apparatus, comprising:
a memory storing instructions; and
at least one processor in communication with the memory, the at least one processor configured, upon execution of the instructions, to perform the following steps:
receive first downlink control information (DCI), the first DCI indicating a first uplink time-frequency resource, the first uplink time-frequency resource comprising a first group of time-frequency units, wherein a time-frequency unit of the first group of time-frequency units corresponds to a time domain start position and a time domain length in a time domain, and corresponds to a frequency domain start position and a frequency domain length in a frequency domain;
determine a second uplink time-frequency resource for uplink transmission, the first uplink time-frequency resource overlaps the second uplink time-frequency resource in a time domain or overlaps in the time domain and in a frequency domain; and
transmit uplink information on the second uplink time-frequency resource when the uplink transmission meets a first condition, wherein the uplink transmission is scheduled using a second DCI, the uplink transmission is a dynamically scheduled uplink data channel and the second DCI is used to schedule the uplink data channel, or the uplink transmission is a dynamically scheduled uplink sounding reference signal and the second DCI is used to schedule the uplink sounding reference signal, the first condition is that a first DCI sending moment of the first DCI is not later than a second DCI sending moment of the second DCI, the first DCI is multicasting downlink control information comprising group-common downlink control information (GC-DCI).

10. The apparatus according to claim 9, wherein the instructions, when executed by the at least one processor, further cause the communication apparatus to:
skip transmitting the uplink information on an overlapping time-frequency resource between the second uplink time-frequency resource and the first uplink time-frequency resource when the uplink transmission does not meet the first condition.

11. The apparatus according to claim 9, wherein the first uplink time-frequency resource is a preempted time-frequency resource.

12. The apparatus according to claim 9, wherein:
the first DCI sending moment of the first DCI is the first symbol of a downlink control channel carrying the first DCI; and
the second DCI sending moment is a second DCI first symbol of a downlink control channel carrying the second DCI.

* * * * *